(12) United States Patent
Eames

(10) Patent No.: US 6,282,189 B1
(45) Date of Patent: Aug. 28, 2001

(54) UNIFIED ACCESS PLATFORM FOR SIMULTANEOUSLY DELIVERING VOICE AND CELL-BASED SERVICES

(75) Inventor: Thomas R. Eames, Santa Rosa, CA (US)

(73) Assignee: Next Level Communications, L.L.P., Rohnert Park, CA (US)

( * ) Notice: Subject to any disclaimer, the term of this patent is extended or adjusted under 35 U.S.C. 154(b) by 0 days.

(21) Appl. No.: 08/905,775

(22) Filed: Aug. 4, 1997

Related U.S. Application Data

(60) Provisional application No. 60/043,811, filed on Apr. 14, 1997.

(51) Int. Cl.[7] ............................................. H04L 12/64
(52) U.S. Cl. ..................................... 370/352; 370/395
(58) Field of Search ..................... 348/7, 6, 12; 370/395, 370/486, 487, 493, 498, 352, 353, 354, 355, 356, 468, 465, 485; 455/3.1, 4.2, 5.1

(56) References Cited

U.S. PATENT DOCUMENTS

| | | | |
|---|---|---|---|
| 4,441,180 | * | 4/1984 | Schussler . |
| 4,686,667 | | 8/1987 | Ohnsorge ................................. 370/4 |
| 4,819,226 | | 4/1989 | Beckner et al. ........................ 370/55 |
| 4,893,306 | | 1/1990 | Chao et al. ........................... 370/94.2 |
| 5,534,912 | * | 7/1996 | Kostreski ................................. 348/6 |
| 5,610,922 | * | 3/1997 | Balatoni ............................... 370/468 |
| 5,613,190 | * | 3/1997 | Hylton ................................... 455/3.1 |
| 5,668,857 | * | 9/1997 | McHale ............................. 379/93.07 |

OTHER PUBLICATIONS

Hans, J. Matt, Kurt Fussgaenger: "Integrated Broad–Band Communication Using Optical Networks—Results of an Experimental Study"; *IEEE Transactions on Communications*; vol. Com–29, No. 6, Jun. 1981, 868–885.

Arpad G. Toth, Ettore Colombini, Peter J. MacLaren, Robert K. Yates; "Fiber in the Local Exchange Network: A Planning Overview"; *Proceedings of the National Communications Forum*; vol. XXXIX, Oct. 7–9, 1985.

Clemens Baack, Peter Heuer: "Architecture of Broad–Band Communications Systems"; *IEEE Journal on Selected Areas in Communications*; vol. SAC–4, No. 4, Jul. 1986. 542–550.

D.V. Batorsky, D.R. Spears and A.R. Tedesco: "The Evolution of Broadband Network Architectures"; published in the conference record of the IEEE Global Telecommunications Conference and Exhibition, Nov. 28–Dec. 1, 1988, 367–373.

J. Stern, J.A. Quayle, S.A. Cooper: "Full Services Access Network Requirements Specification"; Published as a specification of the Full Services Network Working Group; Release Date Feb. 25, 1997, 1–44.

\* cited by examiner

*Primary Examiner*—Huy D. Vu
(74) *Attorney, Agent, or Firm*—Covington & Burling

(57) ABSTRACT

A Unified Access Platform capable of providing telephone and high speed data services in a number of different local loop configurations. In a first embodiment, a broadband digital terminal (BDT receives high speed data and telephony signals, and combines them into a cell based signal which is transported to an access multiplexor. At the access multiplexor, a first linecard generates an analog telephone signal, and a second linecard generates a high-speed data signal. Analog telephone service is provided over a first twisted wire pair drop cable, while the high speed data service is provided over a second twisted wire pair drop cable.

In an alternate embodiment, the BDT's cell based signal is transported to two separate terminals. Analog telephone service is provided to a subscriber location from the first terminal, while high speed data service is provided to a second subscriber location from the second terminal.

Yet another embodiment provides analog telephone and high speed data services from a single linecard located in an access multiplexor. The analog telephone and high speed data signals are generated on the linecard and combined using a diplexor. At the residence, a receiving diplexor is used to separate the combine signal. Still another embodiment generates a high speed data signal at an access multiplexor which contains a digital representation of the analog telephone signal. The high speed data signal is sent to the residence, where a receiving device generates an analog telephony signal and transmits the high speed data signal to appropriate terminal equipment.

47 Claims, 15 Drawing Sheets

ODU-BNU TDM CELL FORMAT

TDM SEGMENT INDIVIDUAL DS0 MAPPING

TDM SEGMENT VT1.5 MAPPING

UNIFIED ACCESS PLATFORM FOR SIMULTANEOUSLY DELIVERING VOICE AND CELL-BASED SERVICES

CROSS-REFERENCES

This application claims the benefit of U.S. Provisional Application No. 60/043,811 filed on Apr. 14, 1997 entitled "Unified Access Platform" of which Thomas R. Eames is the inventor, with attorney docket number P723-PROV.

The aforementioned application is incorporated herein by this reference, but is not admitted to be prior art.

FIELD OF THE INVENTION

The present invention relates to a Unified Access Platform (UAP) which is capable of providing telephone and high speed data services in a number of different local loop configurations.

BACKGROUND OF THE INVENTION

New telecommunications services such as Internet access are being offered by phone companies. There is a growing demand for high speed Internet access, in addition to other new services such as digital television, which require special high speed connections from networks to residences. However, basic telecommunications services such as Plain Old Telephony service (POTs) are at present the main source of revenue for telephone companies. These services are typically provided from a telephone central office to the residences over twisted copper wire pairs which in some cases have been in place for many years, and in some cases have been recently upgraded.

The part of the telecommunications network that connects a telephone central office to the subscriber residences is known as the access network or the local loop. The local loop technology is still based primarily on the use of twisted wire pairs, but some optical fiber has been used to reach terminals for telephone service. To date there has been little deployment of high speed digital data services. When used herein, the term high speed data services refers to any type of digital data service including Internet access and digital video.

Access network equipment for telecommunications services must be able to support POTs services as well as being able to support new digital services which will eventually have high penetration rates.

A number of technologies for providing high speed digital data services have been explored and include wireless, Hybrid Fiber Coax (HFC), Fiber-to-the-Curb (FTTC), Fiber-to-the-Home (FTTH), Asymmetrical Digital Subscriber Line (ADSL) and Very high rate Digital Subscriber Line (VDSL).

A general conclusion is that although all of these technologies will play a role in phone companies' long term business objectives, the majority of today's upgradable narrowband deployment needs will best be met by switched wireline infrastrutures based on FTTC, ADSL, and VDSL technologies.

Because the service areas are all different in terms of the length and quality of the telephone wire between the telephone central office and the residences, the number and type of homes and their distance from the telephone central offices, no single technology or configuration of that technology will be optimized for all applications and all deployment scenarios. It can also be the case that a central office may be located in an area which has both urban and suburban characteristics (e.g. some old apartment buildings as well as new housing developments), so that a mixture of FTTC, ADSL, and VDSL technologies are required.

Present solutions to the problem of delivering signals over twisted wire pairs involve placing additional equipment in the telephone central office to transmit and receive high speed data signals, and to convert the high speed data signals from a packet based signal to a circuit based signal compatible with the Public Switched Telecommunications Network (PSTN).

Sometimes, because of the distance between the subscriber residence and the central office, the equipment for transmission and reception of high speed data signals over twisted wire pair must be placed remote from the central office, and closer to the subscriber residence. This can be accomplished by putting a device called a channel bank near an existing Remote Terminal (RT) which provides analog telephone service.

For transmission over the twisted wire pair, the analog telephone signal must be combined with the high speed data signal using a diplexor. At the residence, a diplexor is used to separate the signals again.

In the presently used configuration, numerous problems are encountered including the need to convert packet or cell based high speed data signals to frame based signals compatible with the public switched telephone network; the need to deploy additional racks of equipment in both the remote location and the central office to support the high speed data applications; the need to have separate computers to program the telephony equipment and high speed data equipment, and the need for external diplexors at the central office or remote terminal and the subscriber residence to combine the analog telephone signals with the high speed data signals and separate them back out again. In addition, there may be noise from the analog telephone signal which interferes with the high speed digital data signal.

There is the need for a system which can combine high speed data signals with digital telephony signals and generate a combined high speed data and analog telephone signal which can be transmitted over twisted wire pair from a terminal which can be located in the central office or remotely.

For these reasons it is necessary to have a flexible terminal which can be used in both the central office or in the field, and which can generate the analog telephone signal and high speed data signal on a single plug-in card. In addition, a means of transporting traditional voice signals combined with high speed data signals in the access network is required.

SUMMARY OF THE INVENTION

In a first embodiment high speed data and telephony signals are received at a broadband digital terminal, and combined into a cell based signal which is transported to an access multiplexor. At the access multiplexor an analog phone signal is generated on a first linecard, and a high-speed data signal is generated on a second linecard. Analog telephone service is provided over a first twisted wire pair drop cable, while the high speed data service is provided over a second twisted wire pair drop cable.

In an alternate embodiment high speed data and telephony signals are received at a broadband digital terminal, and combined into a cell based signal which is transported to two separate terminals. Analog telephone service is provided to a subscriber location over a twisted wire pair from the first terminal, while high speed data services are provided to a second subscriber location from the second terminal.

Another feature of the present invention is the ability to provide analog telephone and high speed data services from a single linecard located in an access multiplexor. The analog telephone and high speed data signals are generated on the linecard and combined using a diplexor. At the residence, a receiving diplexor is used to separate the analog telephone and high speed data signals.

An alternate embodiment for simultaneous delivery of telephone service and high speed data is to generate a high speed data signal at an access multiplexor which contains a digital representation of the analog telephone signal. The high speed data signal is sent from the access multiplexor to the residence, where a receiving device generates an analog telephony signal and transmits the high speed data signal to the appropriate terminal equipment.

The combined transport of digital telephony signals and high speed data signals in a cell based Asynchronous Transport Mode (ATM) format allows for flexible deployment of the access equipment and the ability to simultaneously support traditional telephone services as well as advanced digital data services.

The access equipment can be configured such that analog telephone service can be provided to subscribers in one geographical location while simultaneously providing data service to subscribers in a different geographic location, all from one service platform which has telephone and data interfaces. The ability to provide a mix of services over different types and lengths of twisted wire pair drop cables allows for flexible provisioning of services. Combining voice, video, and data services for transmission over a variety of drop cable media while maintaining the ability to transport traditional analog telephony signals has not been previously accomplished.

The accompanying drawings, which are incorporated in and form a part of the specification, illustrate the embodiments of the present invention and, together with the description serve to explain the principles of the invention.

Figure 15:
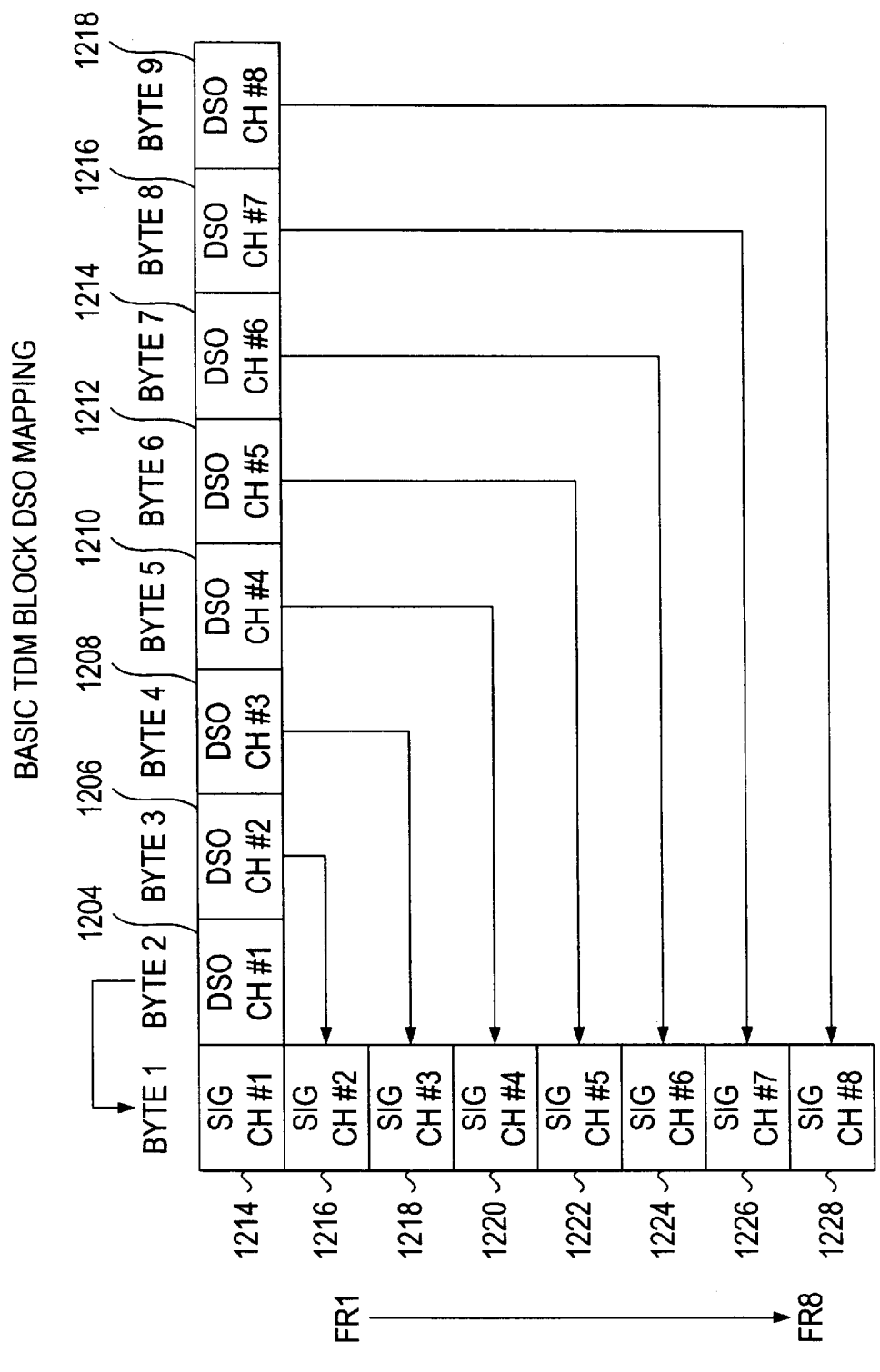

FIG. 15. Illustrates the basic TDM block DS0 mapping.

DETAILED DESCRIPTION OF THE PREFERRED EMBODIMENT

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 15 in particular, the apparatus of the present invention is disclosed.

Figure 1:
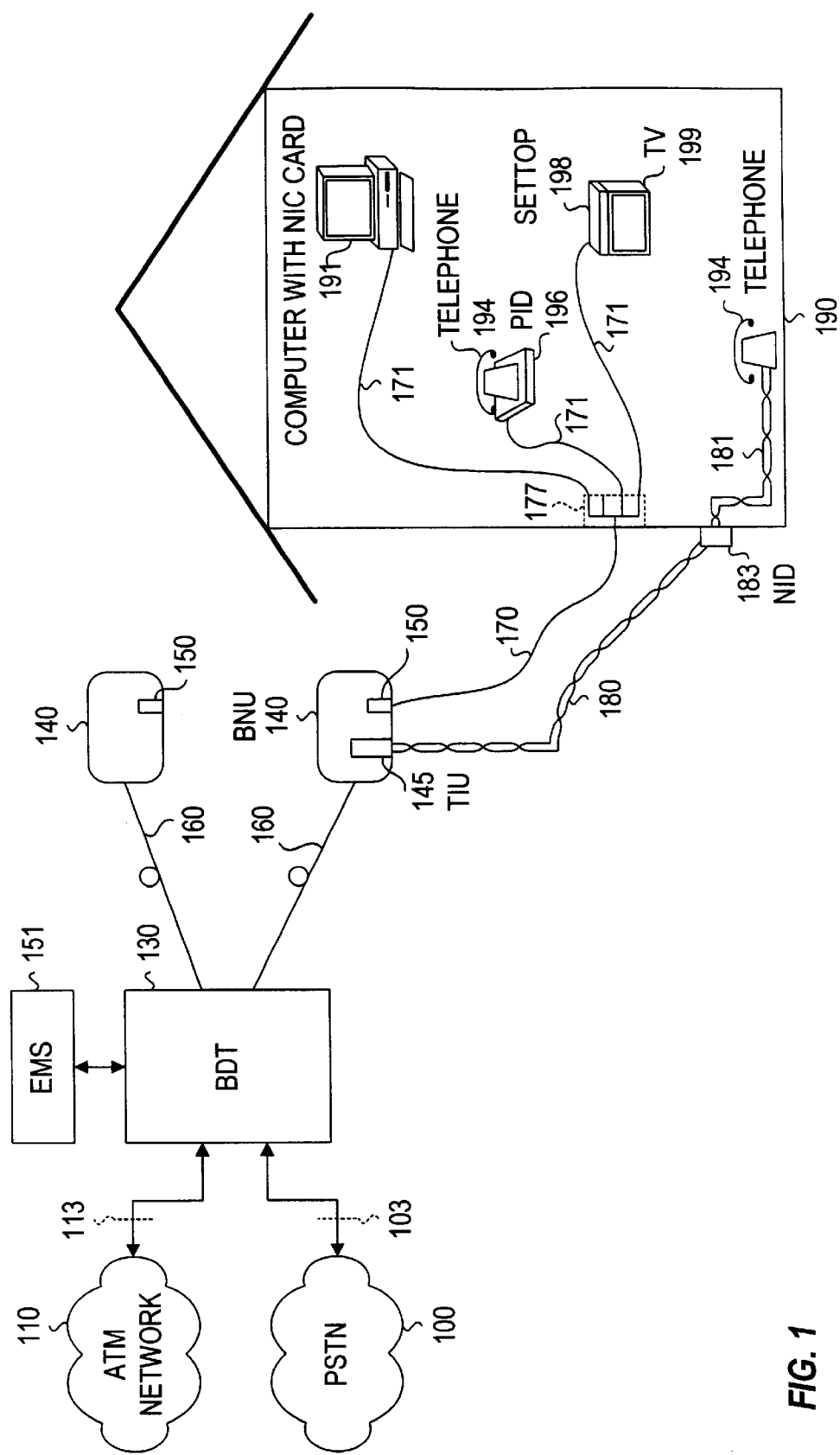
FIG. 1 illustrates a fiber-to-the-curb access system with coaxial drop cables.

FIG. 1 illustrates a Fiber-to-the-Curb (FTTC) network in which various devices in the residence 190 are connected to the Public Switched Telecommunications Network (PSTN) 100 or Asynchronous Transfer Mode (ATM) network 110. The devices in the residence 190 can include telephone 194, television (TV) 199 with a television set-top 198, computer with Network Interface Card (NIC) 191, and Premises Interface Device (PID)196 connected to a telephone 194.

The FTTC network illustrated in FIG. 1 works by connecting a Broadband Digital Terminal 130 to the PSTN 100 and ATM network 110. The PSTN-BDT interface 103 is specified by standards bodies, and in the US are specified by Bellcore specifications TR-TSY-000008, TR-NWT-000057 or GR-NWT-000303. The BDT 130 can also receive special services signals from private or non-switched public networks. The physical interface to the PSTN is twisted wire pairs carrying DS-1 signals, or optical fibers carrying OC-3 optical signals.

The interface to the ATM network-BDT interface 113 can be realized using an OC-3 or OC-12c optical interfaces carrying ATM cells. In a preferred embodiment, BDT 130 has two OC-12c broadcast ports, which receive signals carrying ATM cells, and one OC-12c interactive port which receives and transmits signals.

An element management system (EMS)151 is connected to BDT 130 and forms part of the Element Management Layer (EML) which is used to provision services and equipment on the FTTC network, in the central office where the BDT 130 is located, in the field, or in the residences. The EMS 151 is software based and can be run on a personal computer in which case it will support one BDT 130 and the associated access network equipment connected to it, or can be run on a workstation to support multiple BDTs and access networks.

Broadband Network Units (BNUs) 140 are located in the serving area and are connected to BDT 130 via optical fiber 160. Digital signals in a format which is similar to the Synchronous Digital Hierarchy (SDH) format are transmitted to and from each BNU 140 over optical fiber 160 at a rate of 155 Mb/s. In a preferred embodiment optical fiber 160 is a single-mode fiber and a dual wavelength transmission scheme is used to communicate between BNU 140 and BDT 130. In an alternate embodiment a single wavelength scheme is used in which low reflectivity components are used to permit transmission and reception on one fiber.

A Telephony Interface Unit (TIU) 145 in BNU 140 generates an analog Plain Old Telephony (POTs) signal which is transported to the residence 190 via a twisted wire pair drop cable 180. At the residence 190 a Network Interface Device (NID) 183 provides for high-voltage protection and serves as the interface and demarcation point between the twisted wire pair drop cable 180 and the inside twisted wire pairs 181. In a preferred embodiment TIU 145 generates POTs signals for six residences 190, each having a separate twisted wire pair drop cable 180 connected to BNU 140.

As shown in FIG. 1, a Broadband Interface Unit (BIU) 150 is located in BNU 140 and generates broadband signals which contain video, data and voice information. BIU 150 modulates data onto an RF carrier and transmits the data over a coaxial drop cable 170 to a splitter 177, and over inside coaxial wiring 171 to the devices in the residence 190.

In a preferred embodiment 64 BNUs 140 are served by an BDT 130. Each BNU serves 8 residences 190. In an alternate embodiment, each BNU 140 serves 16 residences 190.

As shown in FIG. 1, each device connected to the inside coaxial wiring 171 will require an interface sub-system which provides for the conversion of the signal from the format on the inside coaxial wiring 171 to the service interface required by the terminal equipment, which can be a telephone 194, television 199, computer, or other device. In a preferred embodiment, the PID 196 extracts time division multiplexed information carried on the inside coaxial wiring 171 and generates a telephone signal compatible with telephone 194. Similarly, the television set-top 198 converts digital video signals to analog signals compatible with TV 199. The NIC card generates a computer compatible signal.

In the system illustrated in FIG. 1, a Network Interface Device (NID) 183 is located on the side of residence 190 at what is known in the industry as the network demarcation point. For the delivery of telephony services NID 183 is a passive device whose principal functions are lightning protection and the ability to troubleshoot the network by allowing connection of a telephone 194 to the twisted wire pair drop cable 180 to determine if wiring problems exist on the inside twisted wire pairs 181.

Figure 2:
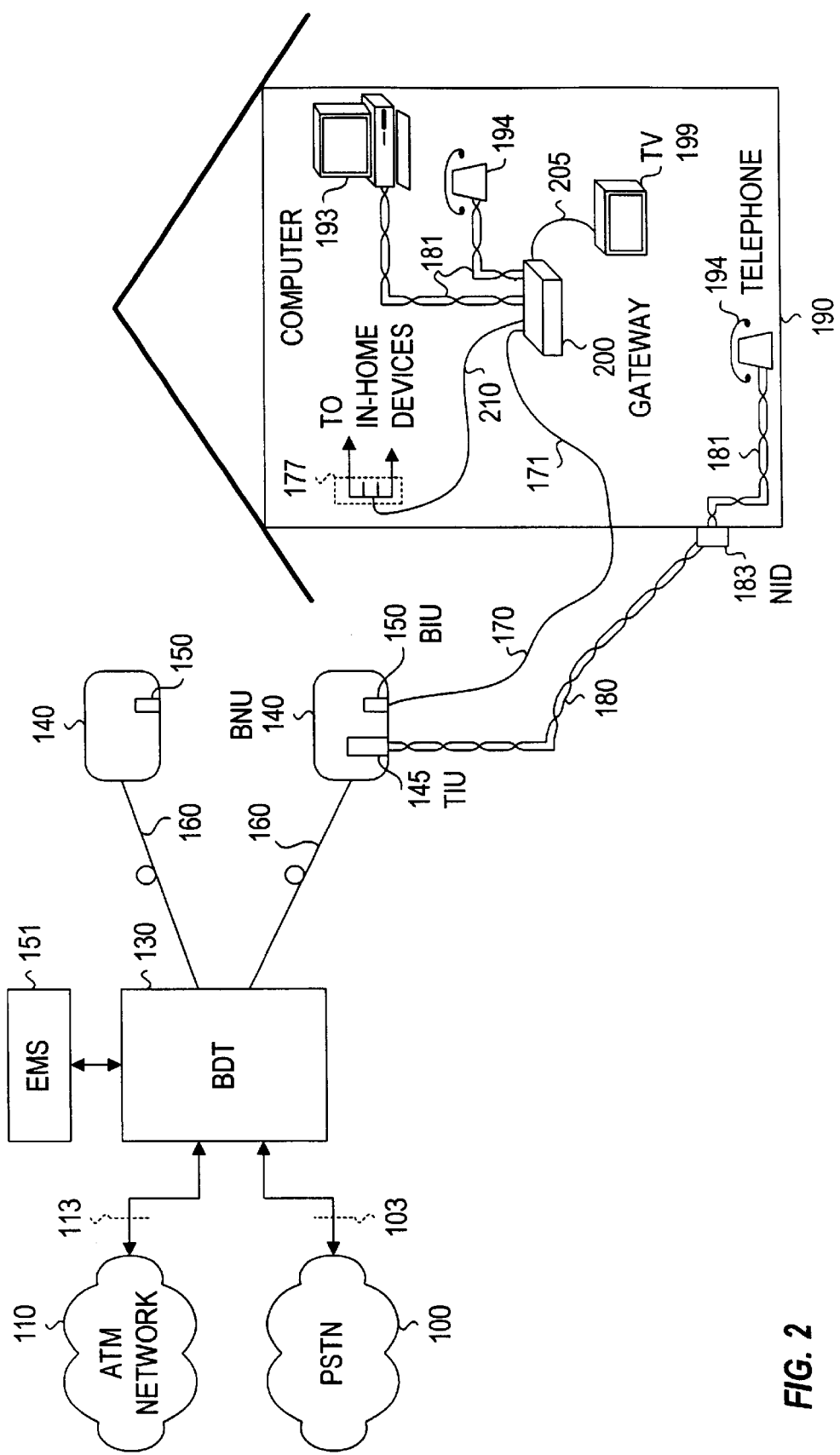
FIG. 2 illustrates a fiber-to-the-curb access system with a gateway used in the residence for the distribution of video, data and telephony signals.

FIG. 2 illustrates the use of a gateway 200 to generate signals compatible with the devices in the home, which are connected to the gateway 200 via inside twisted wire pairs 181 or inside coaxial cable wiring 210 and a splitter 177. The connection to the splitter is made using a gateway-splitter connection 210, which in a preferred embodiment is coaxial cable. A direct connection to a television can be made using a gateway-television connection 205, which in a preferred embodiment is a four conductor cable carrying an S-video signal.

The use of a gateway 200 can reduce the number of devices required in the residence 190 to interface between the access network and the terminal equipment including television 199, telephone 194, and computer 193.

Figure 3:
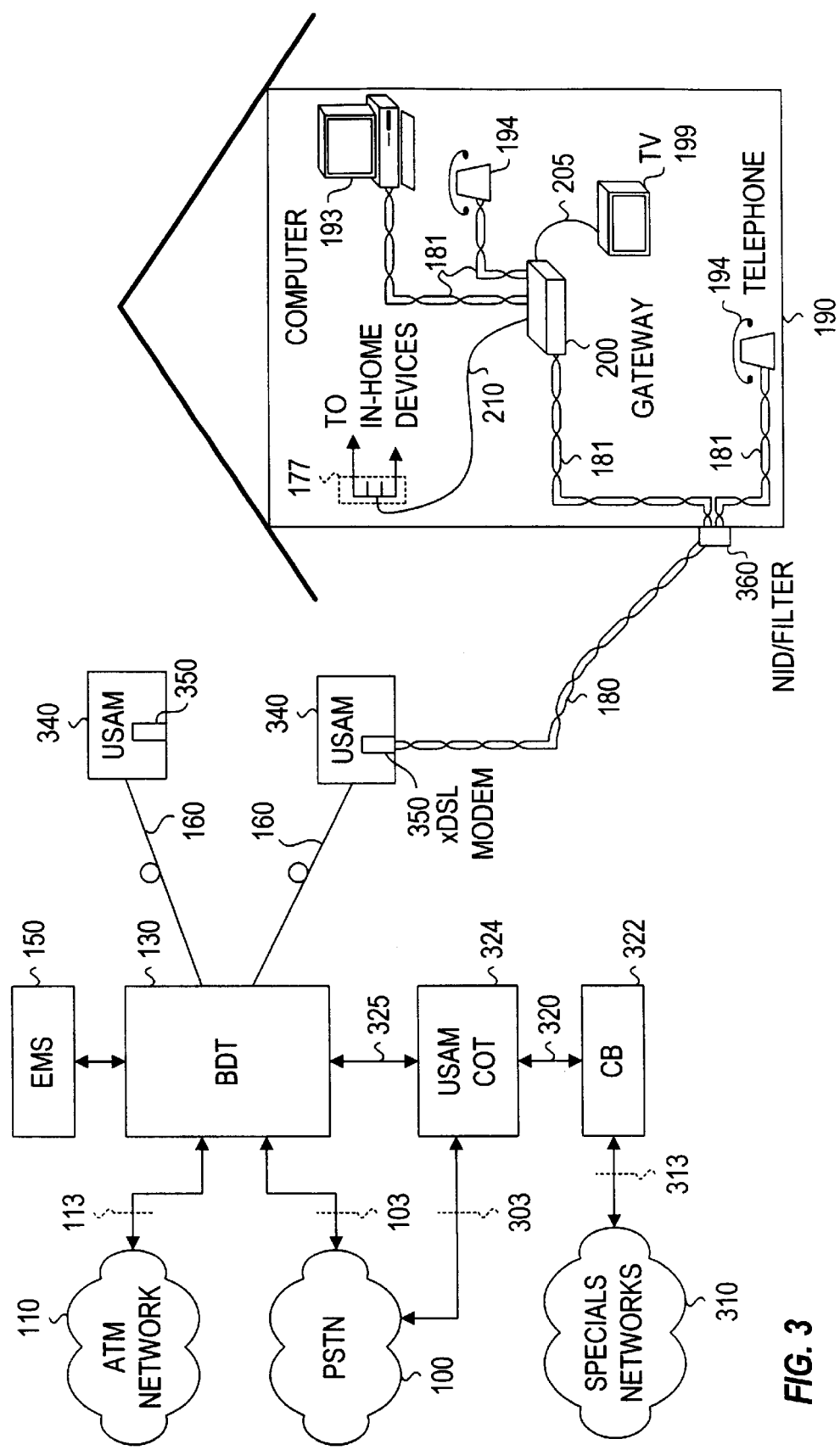
FIG. 3 illustrates a fiber-to-the-curb access system with twisted wire pair drop cable to a residence having a gateway.

FIG. 3 illustrates a FTTC network which relies on twisted wire pair drop cables 180 instead of coaxial drop cables 170. This embodiment is preferable when it is cost prohibitive to install coaxial drop cables from BNUs 140 to residences 190.

As shown in FIG. 3, a Universal Service Access Multiplexor (USAM) 340 is located in the serving area, and is connected to BDT 130 via optical fiber 160. An xDSL modem 350 provides for the transmission of high-speed digital data over the twisted wire pair drop cable 180 to and from residence 190. When used herein, the term xDSL refers to any one of the twisted wire pair digital subscriber loop transmission techniques including High Speed Digital Subscriber Loop, Asymmetric Digital Subscriber Loop, Very high speed Digital Subscriber Loop, Rate Adaptive Digital Subscriber Loop, or other similar twisted wire pair transmission techniques. Such transmission techniques are know to those skilled in the art. The xDSL modem 350 contains the circuitry and software to generate a signal which can be transmitted over the twisted wire pair drop cable 180, and which can receive high speed digital signals transmitted from gateway 200 or other devices connected to the subscriber network.

Traditional analog telephone signals are combined with the digital signals for transmission to the residence 190 and a NID/filter 360 is used to separate the analog telephone signal from the digital signals. The majority of xDSL transmission techniques leave the analog voice portion of the spectrum (from approximately 400 Hz to 4,000 Hz) undisturbed. The analog telephone signal, once separated from any digital data signals in the spectrum, is sent to telephone 194 over the inside twisted wire pairs 181.

The digital signals which are separated at the NID/filter 360 are sent from a separate port on the NID/filter 360 to the gateway 200. The gateway serves as the interface to the devices in the residence 190 including the television 199, the computer 193, and additional telephone 194.

The central office configuration illustrated in FIG. 3 includes a Universal Service Access Multiplexor Central Office Terminal (USAM COT) 324 connected to BDT 130 via a USAM COT-BDT connection 325, which in a preferred embodiment is an STS3c signal transmitted over a twisted wire pair. The PSTN-USAM COT interface 303 is one of the Bellcore specified interfaces including TR-TSY-000008, TR-NWT-000057 or TR-NWT-000303. The USAM COT 324 has the same mechanical configuration as the USAM 340 in terms of power supplies and common control cards, but has line cards which support twisted wire pair interfaces to the PSTN (including DS-1 interfaces) and cards which support STS3c transmission over twisted wire pair for the USAM COT-BDT connection 325.

A Channel Bank (CB) 322 is also used in the central office to connect specials networks 310, comprised of signals from special private or public networks, to the access system via the specials networks-CB interface 313. In a preferred embodiment, the CB-USAM COT connection 320 are DS1 signals over twisted wire pairs.

When used herein the term subscriber network refers in general to the connection between the BNU 140 and the devices or gateway 200 in the residence 190 or the connection between USAM 340 and the devices or the gateway in the residence 190. The subscriber network may be comprised of coaxial cable and a splitter, twisted wire pairs, or any combination thereof.

Although FIG. 2 and FIG. 3 illustrate the gateway 200 located inside the living area of residence 190, the gateway can be located in the basement, in the garage, in a wiring closet, on an outside wall of the residence 190, in the attic, or in any of the living spaces. For outside locations gateway 200 will require a hardened enclosure and components which work over a larger temperature range than those used for a gateway located inside the residence 190. Techniques for developing hardened enclosures and selecting temperature tolerant components are known to those skilled in the art.

Figure 4:
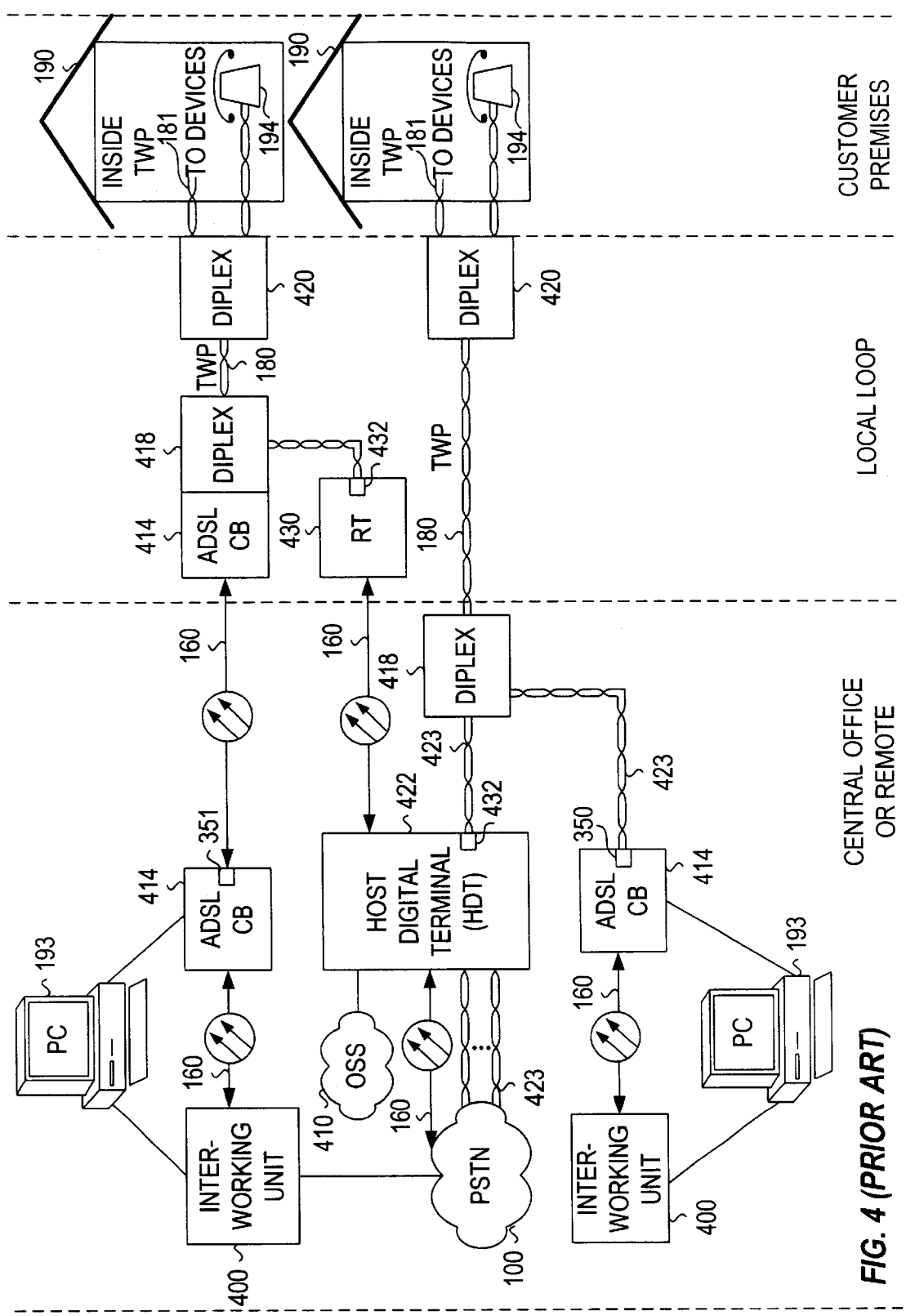
FIG. 4 illustrates the prior art which has been used for the delivery of analog telephone signals in conjunction with high speed data signals.

FIG. 4 illustrates system architectures which have been used to provide high speed data services over existing twisted wire pair networks. In these systems a Host Digital Terminal (HDT) 422 is connected to the PSTN 100 via twisted wire pairs 423 or optical fiber 160. A Remote Terminal (RT) 430 is connected to the HDT 422 via one or more optical fibers 160. An analog POTs linecard 432 is located in RT 432 and can provide analog telephone services over distances up to approximately 12,000 ft.

As shown in FIG. 4, an analog POTs linecard 432 can be located directly in HDT 422 to provide analog telephone service to residences which are within 12,000 ft. of the telephone central office or remote structure.

The architecture illustrated in FIG. 4 is based on the provisioning of telephone service to subscribers. The Operational and Support Systems (OSS) 410 connected to HDT 422 support basic and advanced telephone services, but does not support advanced high speed data services.

For the additional high speed data services, the traditional approach has been to utilize overlay equipment to provide those services. FIG. 4. illustrates the use of ADSL Channel Banks (ADSL CBs) 414 which are added to the network to provide high speed data services. An ADSL CB 414 with an xDSL modem 350 can be added at the central office, and routes data signals into an Inter-Networking Unit (INU) 400 which takes data signals which are typically in the form of Internet Protocol (IP) packets and adapts them for transmission on the PSTN 100 in a PSTN compatible format such as frame relay, or switched multimegabit data service, or switched 56 data service. Because the OSS 410 does not support high speed data services, a separate computer 193 is used to configure the INU 400 and provision data services.

Referring to the upper portion of FIG. 4, a fiber optic transceiver 351 can be used in ADSL CB 414 to transmit high speed data signals over an optical fiber 160 to an ADSL CB 414 located in the local loop, remote from the central office. The ADSL CB 414 in the local loop can be located near the RT 430, and a line side diplex filter 418 is used to combine the analog telephony signal with the high speed data signal. The combined signals are transmitted over twisted wire pair drop cable 180 to a subscriber side diplex filter 420 which separates the high speed data signal from the analog telephony signal.

The lower portion of FIG. 4 illustrates how high speed data can be transmitted from an ADSL CB in the telephone central office or remote office to a subscriber. The high speed data signals generated on XDSL modem 350 are transmitted over twisted wire pair 423 to a line side diplex filter 418 which combines the high speed data signal with the analog telephony signal generated on the analog POTs linecard 432. The combined signals are transmitted over twisted wire pair drop cable 180, and are received at the residence 190, where a subscriber side diplex filter 420 separate the high speed data signal from the analog telephony signal. The high speed data signals are transmitted over the inside twisted wire pairs 181 to devices in the residence, while the analog telephony signal is transmitted to telephone 194.

Figure 5:
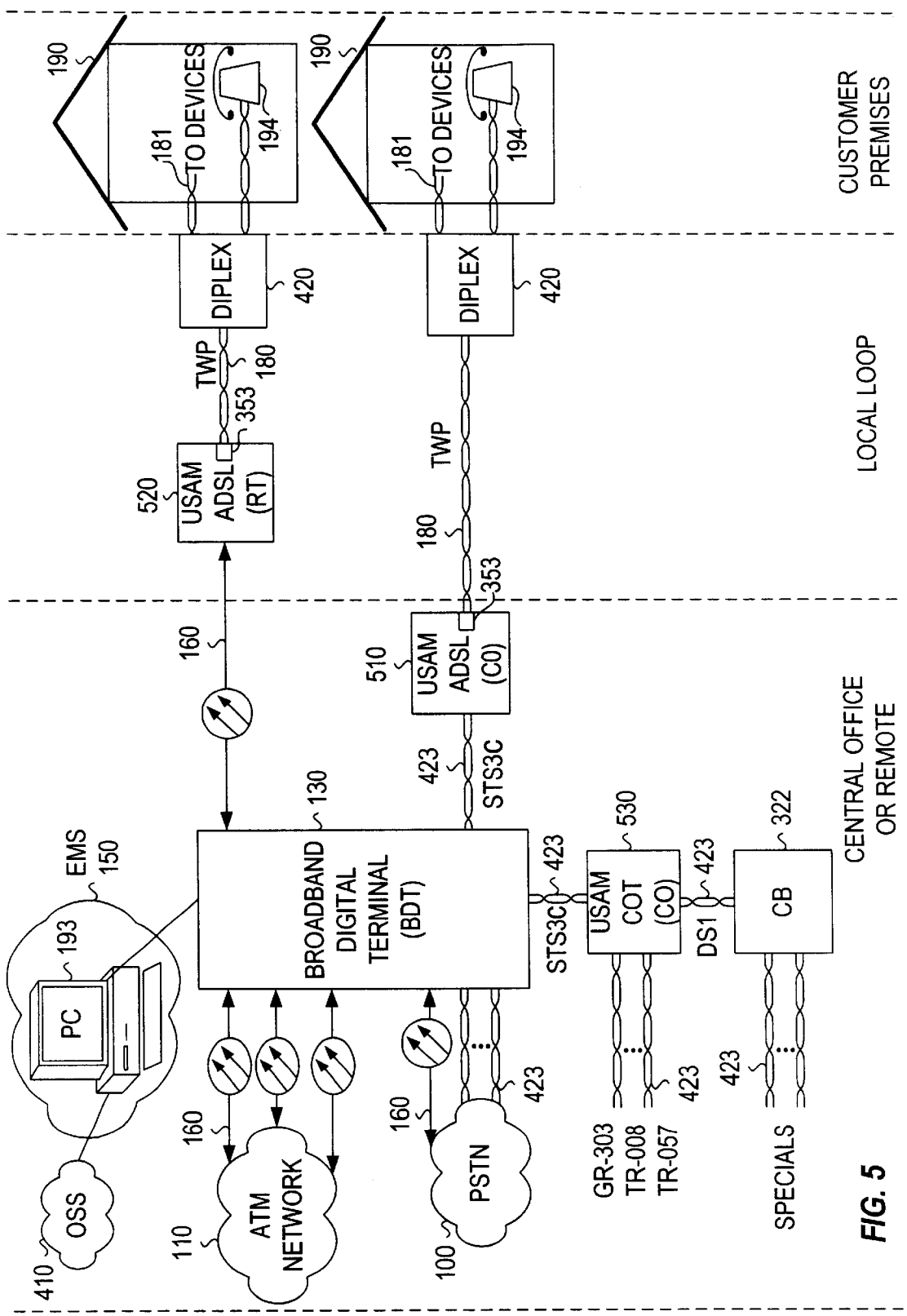
FIG. 5 illustrates a system in which the Universal Service Access Multiplexor is used with Asymmetric Digital Subscriber Loop (ADSL) transmission techniques to provide analog telephone and high speed data services.

FIG. 5 illustrates one embodiment of the present invention for providing both high speed data and voice services from a single access network platform. In this architecture, a BDT 130 is connected to an ATM network 110 via optical fibers 160 using the ATM network-BDT interfaces 113, and simultaneously to the PSTN 100 via optical fibers 160 and twisted wire pairs 423 using the PSTN-BDT interfaces 103 previously described ATM/TDM description. An EMS 151 which consists of a computer 193 and specialized EML software allows for the provisioning of traditional telephone as well as new services. OSS 410 supports the provisioning of traditional telephone services, and as the OSS 410 is updated, EMS 151 allows for new services to be provisioned from the OSS 410 using flow-through provisioning.

At the central office side of the network in FIG. 5, a USAM COT in the Central Office (USAM COT-CO) 530 can be used to interface telephony signals from TR-TSY-000008, TR-NWT-000057 or GR-NWT-000303 interfaces provided by a public or private network to the BDT 130. This is accomplished by receiving the signals in the TR-008, TR-057, and GR-303 formats transmitted over twisted wire pairs 423 at USAM COT-CO 530, grooming and mulitplexing those signals as required, and transmitting them to BDT 130 over twisted wire pairs 423 using a STS3c format. In this way the BDT can be used to handle signals from additional networks.

Additionally, signals from other telecommunications services networks, typically referred to as "specials," can be routed to the BDT 130 through the use of a Channel Bank 322 which receives "specials" on twisted wire pairs 423, multiplexes and grooms the signals, and transmits them on to USAM COT-CO over twisted wire pairs 423. The USAM COT-CO can perform additional grooming and multiplexing as required, and transmit the signals to BDT 130.

Referring to the upper portion of FIG. 5, an optical signal in an SDH type format at 155 Mb/s can be transmitted via optical fiber 160 to USAM ADSL in a Remote Terminal configuration (USAM ADSL-RT) 520. A telephony/xDSL linecard 353 contained within the USAM ADSL-RT 520 is used to generate both an xDSL signal as well as an analog telephony signal. In the case of the system shown in FIG. 5, the telephony/xDSL linecard 353 generates an ADSL signal in addition to the analog telephony signal. The architecture for the telephony/xDSL linecard 353 is described later in this specification and is illustrated in FIGS. 11A–12B.

In the case of the USAM ADSL-RT 520 the combined telephony and high speed data signals are transmitted over the twisted wire pair drop cable 180 to a subscriber side diplex filter 420, which separates the separate the high speed data signal from the analog telephony signal. The high speed data signals are transmitted over the inside twisted wire pairs 181 to devices in the residence, while the analog telephony signal is transmitted to telephone 194.

The lower portion of FIG. 5 illustrates the use of a USAM ADSL in a Central Office configuration (USAM ADSL-CO) 510. In this instance, high speed data and digitized telephony signals are transmitted from BDT 130 to USAM ADSL-CO 510 over twisted wire pairs 423. The USAM-ADSL-CO contains a telephony/xDSL linecard 353 which generates both an xDSL signal as well as an analog telephony signal. These signals are transmitted to residence 190, where there is a subscriber side diplex filter 420 which separates the high speed data signal from the analog telephony signal. The high speed data signals are transmitted over the inside twisted wire pairs 181 to devices in the residence, while the analog telephony signal is transmitted to telephone 194.

Figure 6:
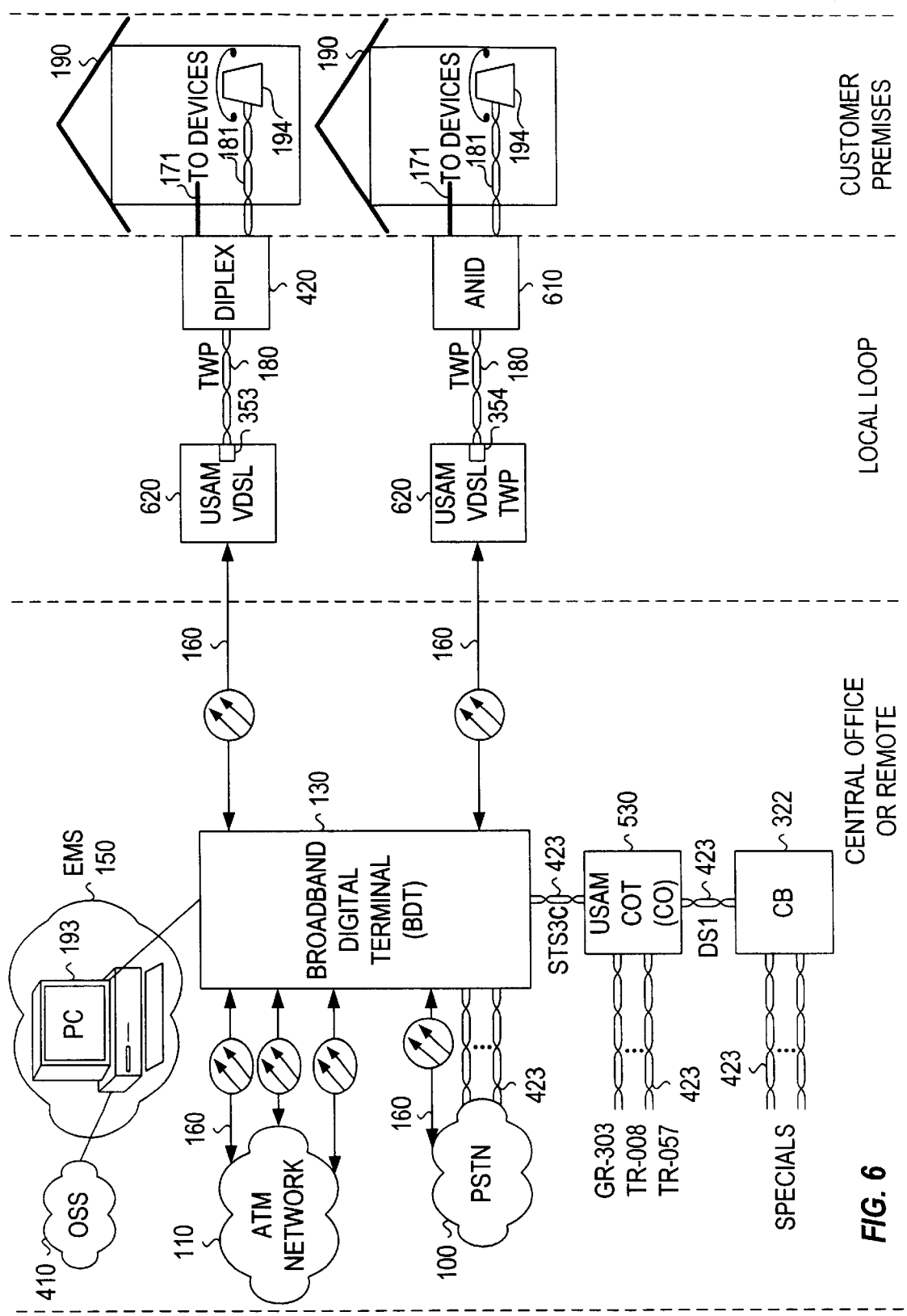
FIG. 6 illustrates a system in which the Universal Service Access Multiplexor is used with Very high speed Digital Subscriber Loop (VDSL) transmission techniques to provide analog telephone and high speed data services.

FIG. 6 illustrates an alternate embodiment, in which a USAM VDSL 620 is used to provide both the telephony and data signals. In this configuration a telephony/xDSL linecard 353 is used to generate both telephony and high speed data signals, but the high speed data signals are in a Very high speed Digital Subscriber Loop (VDSL)format as opposed to an Asymmetric Digital Subscriber Loop (ADSL) format. The principal distinction between ADSL and VDSL is that VDSL transmission supports data rates up to approximately 26 Mb/s downstream to the residence 190, and 5 Mb/s upstream from the residence 190 over distances not exceeding 3,000 ft., while ADSL supports data rates of up to 9 Mb/s downstream, and up to 640 kb/s upstream over distances of up to 9,000 ft. Using ADSL transmission techniques it is possible to span distances up to 12,000 ft. with some reduction in the data rate.

In the upper part of FIG. 6 a system is illustrated in which signals are transmitted from a telephony/XDSL linecard 353 in USAM VDSL 620 over a twisted wire pair drop cable 180 to the subscriber side diplex filter 420 which separates the telephony and high speed data signals. In the embodiment illustrated, the analog telephony signals are transmitted from the subscriber side diplex filter 420 over inside twisted wire pairs 181 to telephone 194. Data signals are transmitted over inside coaxial wiring 171 to devices in residence 190.

The lower portion of FIG. 6 illustrates an alternate embodiment in which digital signals are transmitted from a VDSL modem 354 in USAM VDSL 620 over a twisted wire pair drop cable 180 and are received at an Active Network Interface Device (ANID) 610 which generates an analog telephony signal for transmission over inside twisted wire pairs 181 to a telephone 194. The VDSL modem 354 and ANID 610 architecture which can provide this functionality are described in greater detail in FIGS. 11A and 11B along with the corresponding text.

Figure 7:
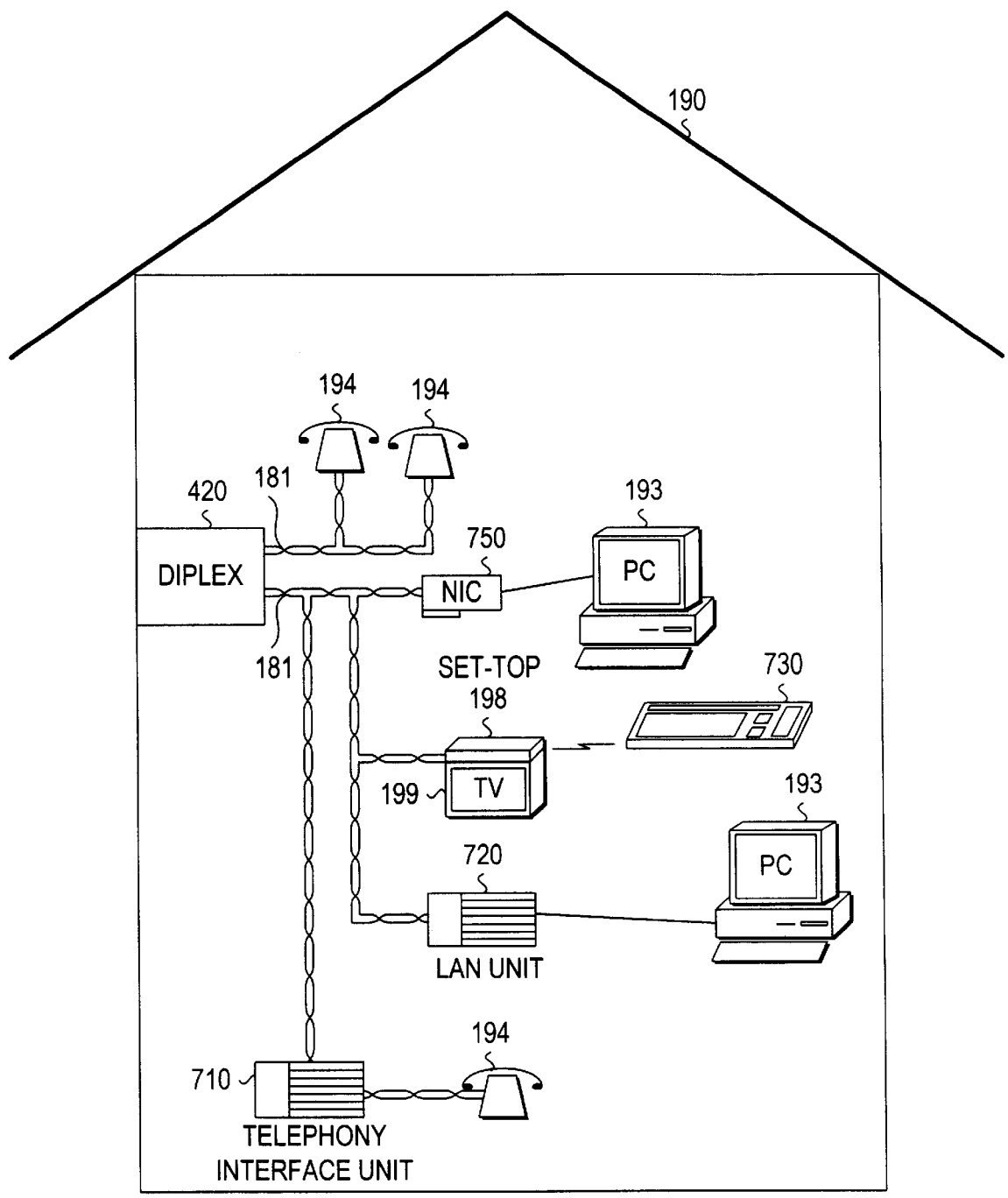
FIG. 7 illustrates the use of twisted wire pair for the distribution of high speed data services in the residence.

FIG. 7 illustrates an embodiment in which signals are received at residence 190 by a subscriber side diplex filter 420 which separates the analog telephony signal from the digital xDSL signal using filter techniques well understood by those skilled in the art. From the subscriber side diplex filter 420 the analog telephony signals are sent over a point-to-multi-point in-home network based on inside twisted wire pairs 181 and are received by telephones 194. In this embodiment, the digital high speed data signal is routed over a point-to-multipoint in-home network based on inside twisted wire pairs 181 to a variety of devices including a residential telephony interface unit 710, a Local Area Network (LAN) unit 720, a television set-top 198, and a Network Interface Card (NIC) 750. The residential telephony interface unit 710 serves to separate the Time Division Multiplexed (TDM) data which contains telephony signals from the digital data stream on twisted wire pair 181, and generate an analog telephony signal compatible with telephone 194. Set-top 198 extracts the ATM cells containing video and set-top specific data and presents that information on TV 199. A remote keyboard 730 can be used with set-top 198 to provide computer-type functionality. LAN unit 720 extracts ATM cells which have the address of the LAN unit 720 and permit the computer 193 connected to the LAN unit 720 to be connected to the Internet or other intranets. Similarly, NIC card 750 interfaces computer 193 to external networks.

Figure 8:
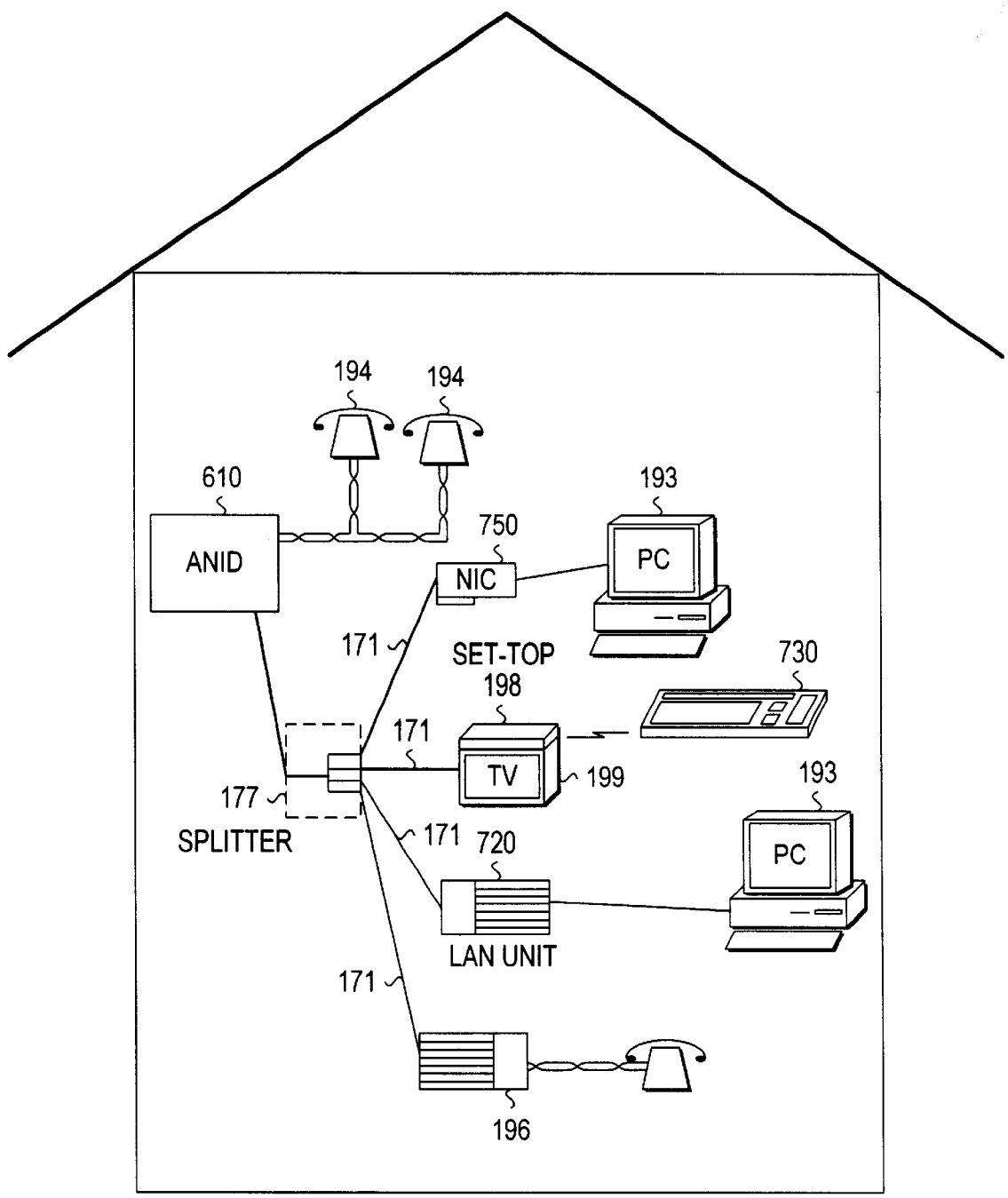
FIG. 8 illustrates the use of coaxial wiring and an active network interface device for the distribution of high speed data services in the residence.

FIG. 8 illustrates an embodiment in which an ANID 610 receives the high speed digital data from a twisted wire pair drop cable 180, and generates a coaxial cable compatible signal which is transmitted over inside coaxial cable wiring 171 to a splitter 177. Splitter 177 is of the type commonly used in homes today for the distribution of cable TV signals. The signals are routed from the splitter 177 over inside coaxial cable wiring 171 to a variety of devices including a Premises Interface Device (PID) 196, a Local Area Network (LAN) unit 720, a television set-top 198, and a Network Interface Card (NIC) 750.

Figure 9:
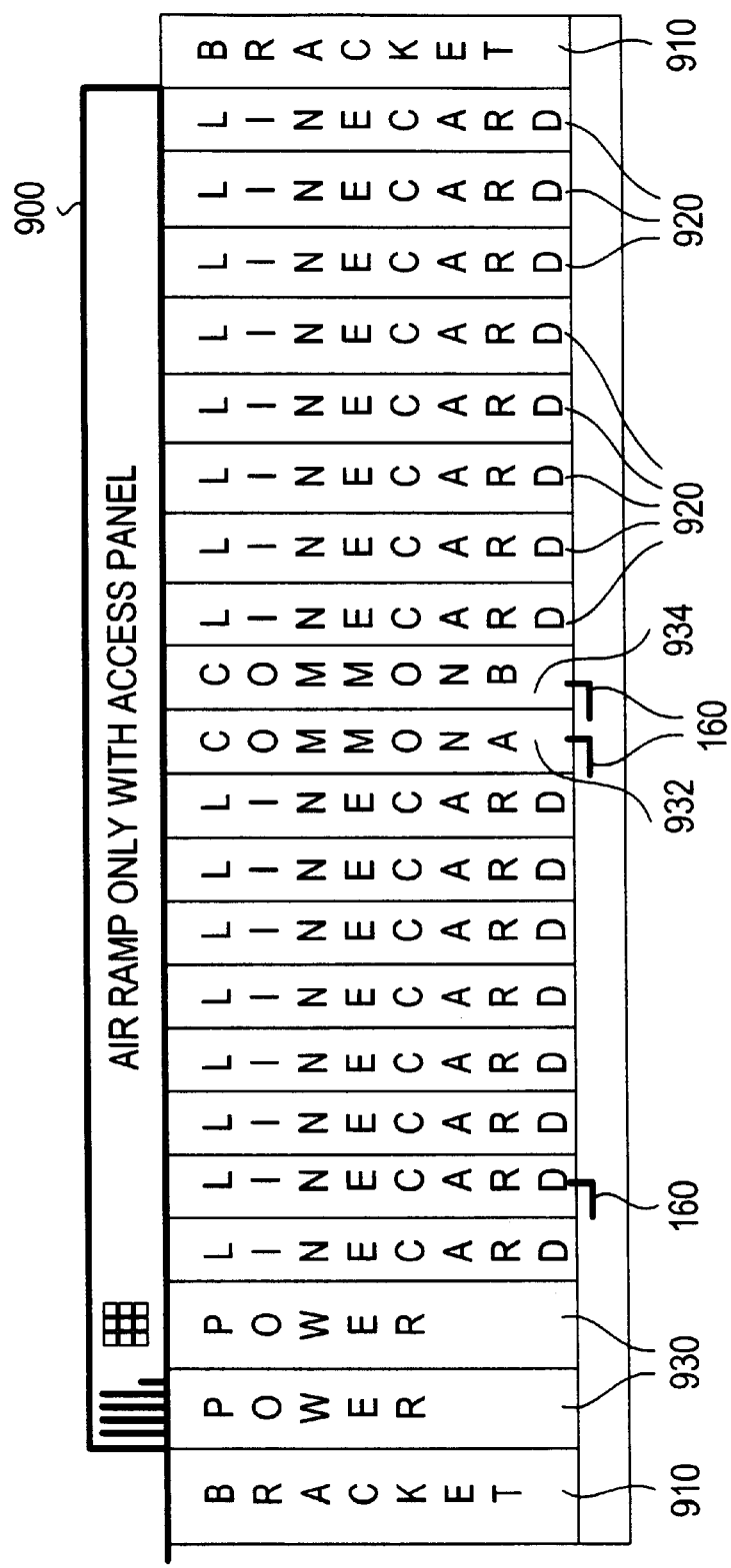
FIG. 9 illustrates the mechanical configuration of the USAM.

FIG. 9 illustrates the mechanical configuration of the Universal Service Access Multiplexor (USAM) 340. The USAM 340 can be rack mounted using brackets 910, and has redundant USAM power supply plug-ins 930. An air ramp 900 is used to provide cooling. There are two common control cards, Common Control A 932 and Common Control B 934, which interface to BDT 130 via optical fiber 160. In a preferred embodiment the bi-directional optical signals sent on optical fiber 160 are in an SDH like format, at a rate of 155 Mb/s.

USAM linecard plug-in units 920 are used to provide telecommunications services to subscribers. These linecards interface to twisted wire pair drop cables 180. In addition to linecards which interface to twisted wire pair drop cables 180 it is possible to have USAM linecard plug-in units 920 have fiber optic interfaces and which support optical transmission over fiber optic cable 160. There are four general categories of linecard plug-in units 920, including narrowband linecards, broadband linecards, VDSL linecards, and ADSL linecards.

The narrowband linecards support legacy telephony services including POTs, coin phone services, T1 services, ISDN services, and all of the existing special telecommunications services.

Broadband linecards support Asynchronous Transfer Mode Universal Network Interfaces (UNIs). These UNI based broadband cards use an appropriate physical media which may be twisted wire pair, coaxial cable, optical fiber, or wireless connections.

VDSL linecards are used to support residential broadband services over existing twisted wire pair drop cables 180 using VDSL transmission techniques, and can support transmission of traditional telephone signals either by generation of a POTs signal on the VDSL linecard and transmission with the digital VDSL signal in different portions of the spectrum, or by transmission of the telephone data in a digital form within the VDSL signal, with generation of the analog POTs signal occurring at the residence 190. In yet another embodiment, analog telephone signals can be combined with the VDSL signal in a diplexor external to the linecard.

In a preferred embodiment the VDSL transmission technique used is based on Quadrature Amplitude Modulation (QAM) transmission techniques in which data is sent in multiple levels in the I and Q channels, with the number of levels depending on the specific characteristics of the twisted wire pair drop cable 180 which is being used. For poor quality drop cables, or where there is a large amount of radio frequency ingress, a single level phase inversion scheme (in both the I and Q channels) is used which results in a Quadrature Phase Shift Keying (QPSK) transmission, which can be considered equivalent to 4-QAM. For better quality transmission channels in high quality twisted wire pair drop cables, 16-QAM or 64-QAM transmission can be used.

ADSL linecards are used to support residential broadband services using ADSL transmission techniques. ADSL transmission techniques are based upon the use of Discrete MultiTone (DMT) transmission, or QAM techniques, including the Carrierless Amplitude Modulation technique, commonly referred to as CAP, which is a method for generation of QAM signals. Analog telephone signals can be transmitted by the ADSL linecards in a manner similar to the VDSL linecards including generating the POTs signal on the ADSL linecard and combining it with the digital ADSL signal, generating the POTs signal externally and combining it with the ADSL signal, or generating the POTs signal at the residence 190.

In a preferred embodiment the USAM 340 supports 16 USAM linecard plug-ins 920. When used for VDSL and ADSL applications, there are 2 VDSL or ADSL circuits per USAM linecard plug-in 920, resulting in 32 VDSL or ADSL circuits per USAM shelf. When configured entirely with ADSL cards the USAM 340 becomes a USAM ADSL-RT 520 or USAM ADSL-CO 510 as illustrated in FIG. 5. When configured entirely with VDSL cards the USAM 340 becomes a USAM VDSL 620 as illustrated in FIG. 6. In an alternate embodiment, there are 4 circuits per VDSL or ADSL linecard.

When USAM 340 is configured for POTs services, there are 6 circuits per linecard in one embodiment, resulting in 96 circuits per USAM shelf. In another embodiment, there are 12 circuits per POTs linecard, resulting in 192 POTs circuits per shelf. The USAM illustrated in FIG. 9 represents a single shelf, but clearly it is possible to have multiple shelves for greater capacity.

In equipping USAM 340 it is also possible to mix the types of linecards to simultaneously provide ADSL, VDSL, and POTs services from the same platform. By having a cell based transport for voice and high speed data it is possible to support a variety of linecards simultaneously and to provide traditional telephone services along with high speed data services.

Figure 10:
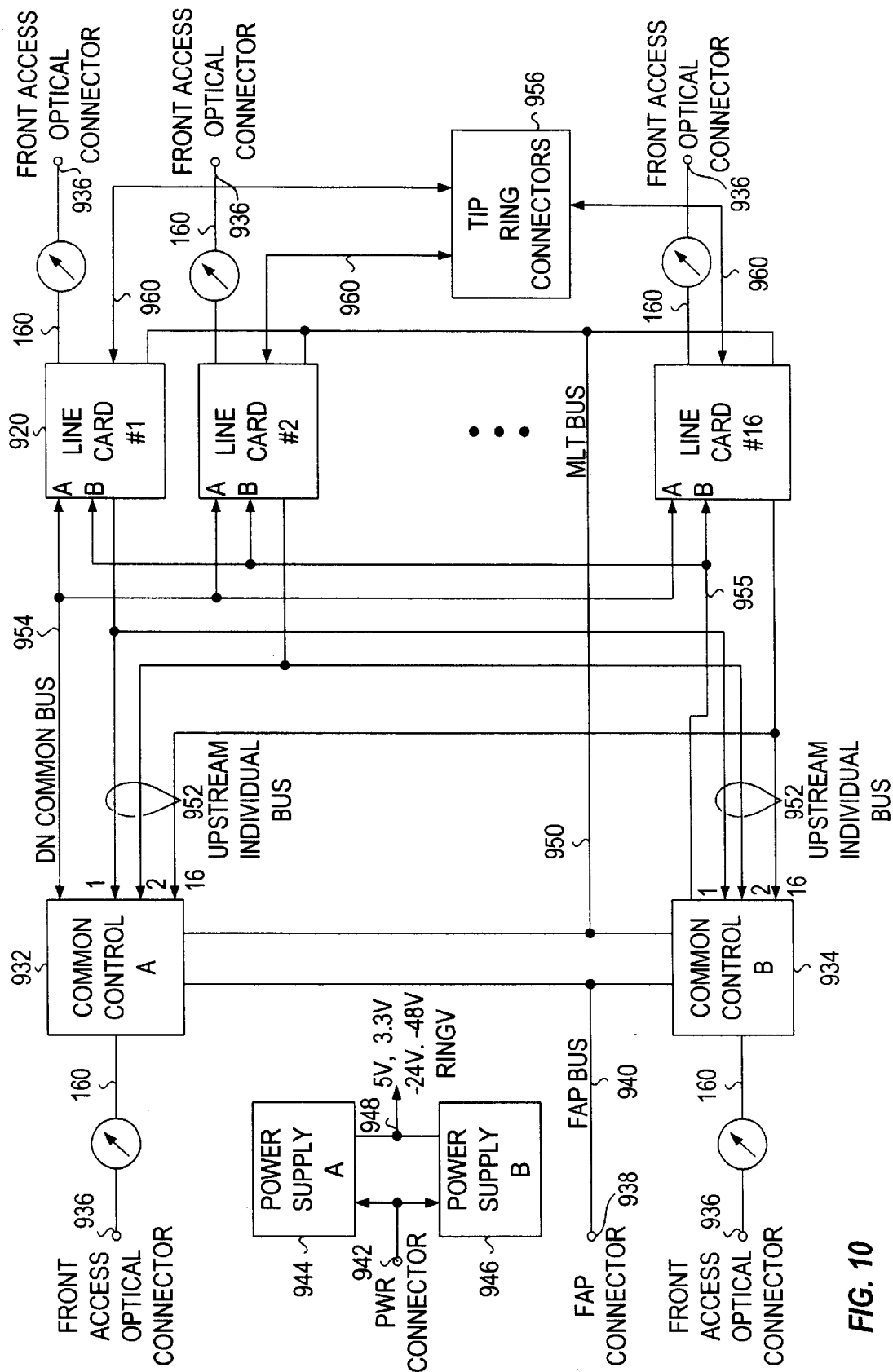
FIG. 10 illustrates the architecture of the USAM.

FIG. 10 illustrates the architecture of USAM 340, and shows how Common Control A 932, and Common Control B 934, are connected via optical fibers 160 to front access panel optical connectors 936. These connectors are connected to optical fibers 160 which are in turn connected to BDT 130. In a preferred embodiment, signals are sent from Common Control A 932 to USAM linecard plug-ins 920 via a downstream common bus A 954, and from Common Control B 934 to USAM linecard plug-ins 920 via a downstream common bus B 955. Downstream common buses A and B 954 and 955 respectively are point-to-multipoint buses, and all of the downstream payload is received at all of the USAM linecard plug-ins 920. Upstream individual buses 952 are used to transmit information from the USAM linecard plug-ins 920 to the Common Control A 932 and Common Control B 934.

A Front Access Panel (FAP) connector 938 allows connection from the front of the USAM to an internal Front Access Panel (FAP) bus 940 which can be used for diagnostics.

A Mechanized Loop Testing (MLT) bus 950 is used to allow central office equipment to simulate a direct connection to a particular twisted wire pair drop cable 180, in spite of the fact that there is actually an optical transmission system between the central office and the twisted wire pair drop cable 180. The MLT bus 950 in conjunction with circuitry on the POTs linecard allows central office equipment to determine the loop resistance and perform other key tests on a specific twisted wire pair drop cable 180.

The Tip and Ring (TR) connectors 956 serve as the point of connectivity between the USAM linecard plug-ins 920 and the twisted wire pair drop cables 180. The linecard-TR connector bus 960 provides the internal connectivity between the USAM linecard plug-ins 920 and the TR connectors 956.

USAM linecard plug-ins 920 which use optical media for transmission and reception are connected to a front access optical connector 936 via optical fiber 160, or in an alternate embodiment the front access optical connector 936 is mounted directly on USAM linecard plug-in 920.

Figure 11A:
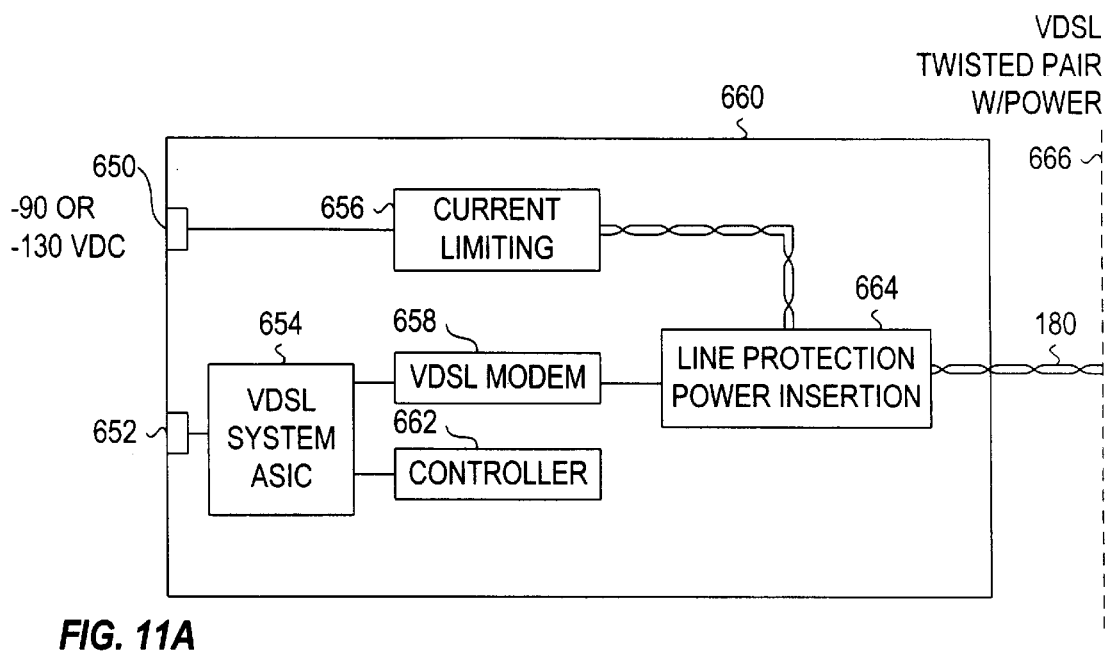
FIG. 11A illustrates the USAM linecard for xDSL applications using network powering.
Figure 11B:
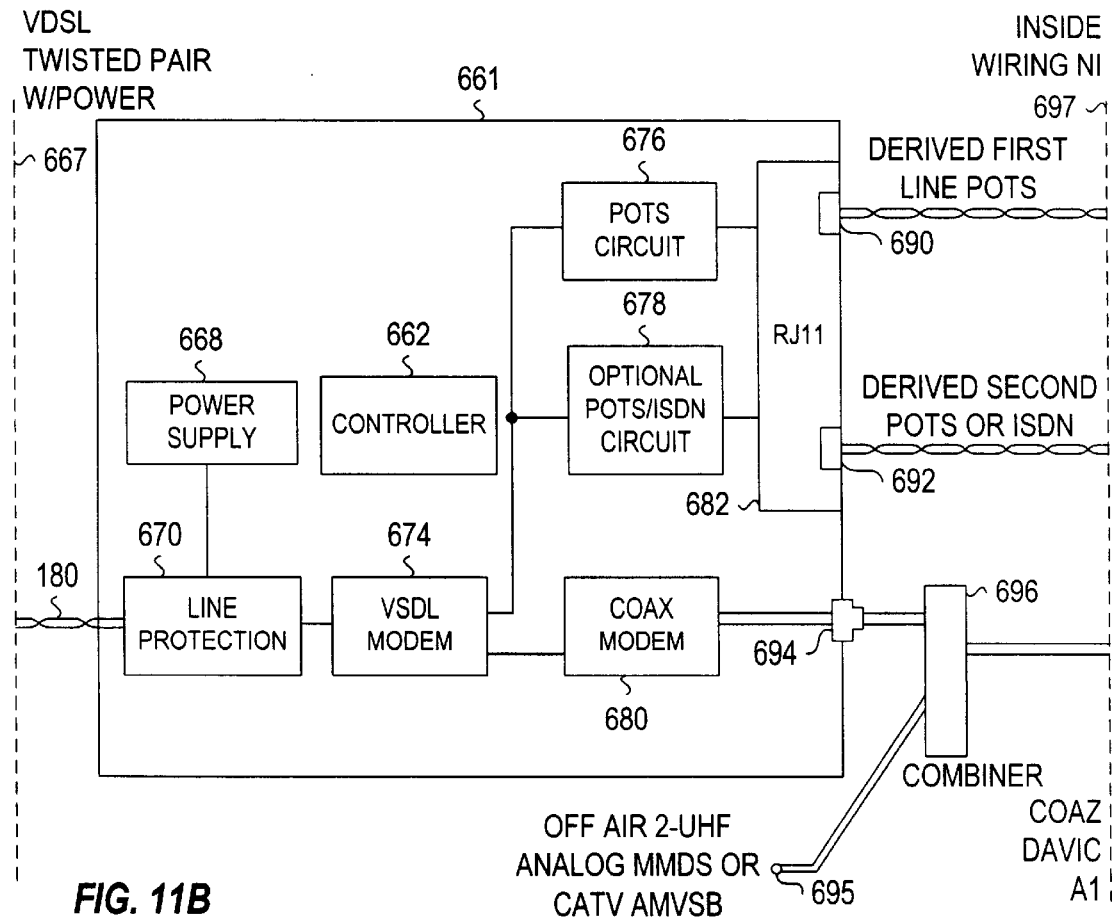
FIG. 11B illustrates the ANID for xDSL applications using network powering.

FIGS. 11A and 11B illustrate an embodiment in which VDSL signals are sent to the residence 190 from a VDSL linecard, along with a powering signal. The signal is received by a unit powered from the USAM which is capable of both deriving data for subsequent transmission in the residence 190 over inside twisted wire pairs 181, or inside coaxial wiring 171, as well as generating an analog telephony signal.

In FIG. 11A a combined digital telephony and data xDSL line side modem 660 at the USAM 340 is illustrated and consists of a VDSL system Application Specific Integrated Circuit (ASIC) 654 which is connected to a USAM backplane bus connector 652, which connects to the downstream common bus A 954, downstream common bus B 955, and upstream individual buses 952. A line side VDSL modem 658 is connected to the VDSL system ASIC 654 and generates a twisted wire pair compatible signal for transmission to the residence over the twisted wire pair drop cable 180. A controller 662, which can be any suitable microcontroller, is used to configure and program the VDSL system ASIC 654.

Power is added via a power connector 650, and a current limiting circuit 656 prevents overcurrents, and a line protection power insertion module 664 permits the combining of the VDSL signal and the powering voltage, which in a preferred embodiment is −90 V and in an alternate embodiment is −130 V. At the twisted wire pair 180 leaving the combined digital telephony and data xDSL line side modem 660 a line side twisted wire pair with power interface 666 is formed.

The subscriber side is illustrated in FIG. 11B, where a subscriber side twisted wire pair with power interface 667 is formed, and connects to a combined digital telephony and data xDSL subscriber side modem 661 via twisted wire pair drop cable 180. Signals with power are received from the combined digital telephony and data xDSL line side modem 660 via the twisted wire pair drop cable 180.

In FIG 11B line protection 670 serves to separate the power and protect the subscriber side VDSL modem 674. Subscriber side VDSL modem 674 separates out the TDM signals containing telephony data and routes that data to a POTs circuit 676. The POTs circuit 676 generates an analog telephony signal which is routed to a twisted wire pair connector assembly 682, which contains a derived first line POTs connector 690, which in a preferred embodiment is an RJ-11 jack.

An optional POTs/ISDN circuit 678 may be present and supports an additional POTs or ISDN line which can be connected via a derived second line POTs or ISDN connector 692 which is present in twisted wire pair connector assembly 682.

In the embodiment shown in FIG. 11B, a coaxial modem 680 also receives and transmits digital data to subscriber side VDSL modem 674. Coaxial modem 680 can take information from subscriber side VDSL modem 674 and generate a coaxial signal, which in a preferred embodiment is the Digital Audio Visual International Council (DAVIC)

profile A type signal. The coaxial signal generated by coaxial modem 680 is routed to a coaxial modem connector 694, and subsequently to a combiner 696. The combiner 696 permits combining of the coaxial modem signal 680 with off-air broadcast television signals which come from an antenna or cable TV system connected to off-air connector 695. The inside wiring network interface 697 has both the analog POTs signals and digital data signals.

Although the embodiment illustrated in FIGS. 11A and 11B show the subscriber side modem and line side modem as VDSL modems, ADSL or other types of modems can be used to realize the invention.

The combined digital telephony and data xDSL subscriber side modem 661 can also be located in gateway 200, and as illustrated in FIG. 3, a variety of devices can be directly connected to the gateway using twisted wire pair, coaxial cable, or other types of wiring.

Figure 12A:
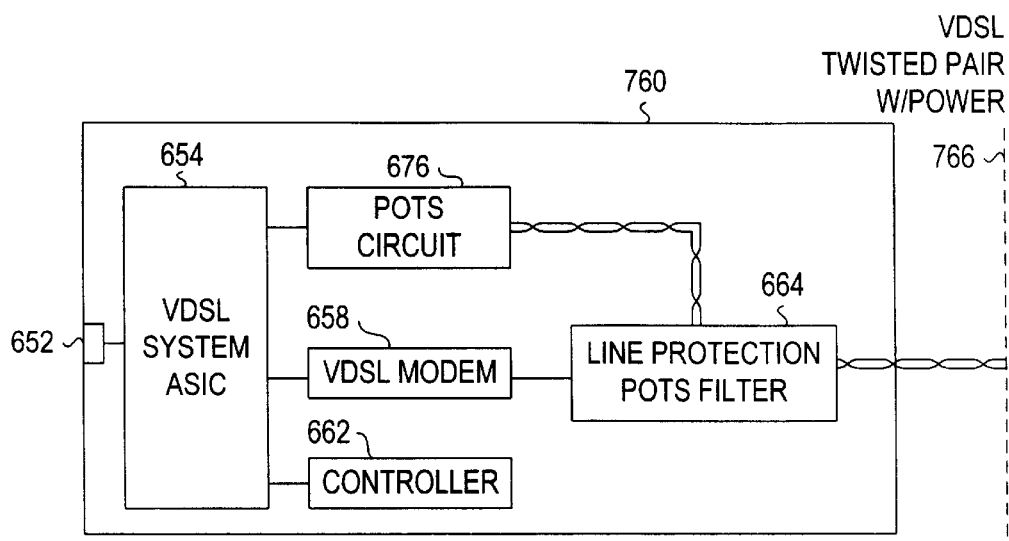
FIG. 12A illustrates the USAM linecard for xDSL applications using local powering.
Figure 12B:
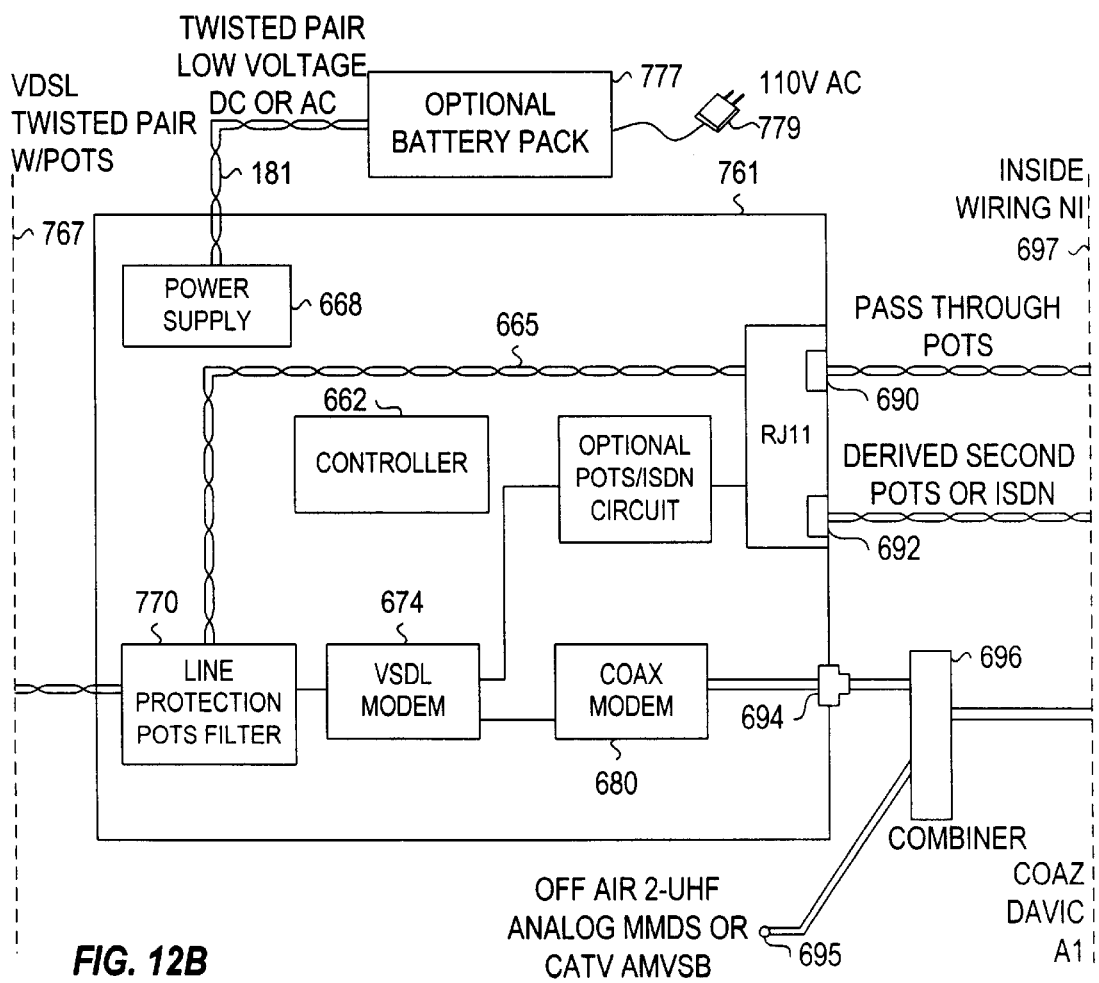
FIG. 12B illustrates the ANID for xDSL applications using local powering.

FIGS. 12A and 12B illustrate an alternate embodiment for transmitting telephony signals along with xDSL data signals. In this embodiment the analog POTs signal is generated on a POTS circuit 676 which is located in a combined analog telephony and data xDSL line side modem 760 which is located in USAM 340. Referring to FIG. 12A, the POTs circuit 676 generates an analog telephone signal which is combined with a digital data signal from VDSL modem 658 in the line protection POTs filter 664 which serves as a line side diplex filter 418. The combined analog telephony signal and digital data signal is present at the line side xDSL twisted wire pair with POTs interface 766.

At the subscriber side, a combined analog telephony and data xDSL subscriber side modem 761 is used to receive the POTs and data signals. In a preferred embodiment, powering from the residence 190 is used via an AC plug 779 and power supply 668. An optional battery pack 777 can be used to provide power to the combined analog telephony and data xDSL subscriber side modem 761 in the event the AC power in the residence 190 fails. Power from the AC plug 779 or optional battery pack 777 is transmitted to power supply 668 using conventional two conductor power cable or inside twisted wire pairs 181.

The combined analog telephony and data xDSL subscriber side modem functions for data according to the description for the data portion of the combined digital telephony and data xDSL line side modem 660. The line protection POTs filter 770 serves to separate the analog telephony signal from the digital data signal and serves to protect VDSL modem 674 and telephone 194 from excessive currents.

In the traditional approach to combining analog telephony signals with xDSL data signals (as shown in FIG. 4) the analog POTs signal is externally combined with the xDSL signal in the line side diplex filter 418. The principal problems with this approach are that there are two twisted wire pairs from the cross connect frame (the connection location for twisted wire pair drop cables 180 coming from the telephone central office) two sets of lightning protection, and unknown characteristics in terms of the trip ring and other impulse noise on the POTs line which could be detrimental to the xDSL signal. By having the POTs circuit 676 integrated onto the combined analog telephony and data xDSL line side modem it is possible to control the interference between the data signals generated by line side VDSL modem 658 and the analog POTs signal. This embodiment minimizes the amount of lightning protection required, as well as assuring that the impulse noise generated by the POTs circuit is characterized and controllable. In addition, a feeder pair from the central office is liberated for reuse.

The embodiment illustrated in FIGS. 12A and 12B show the subscriber side modem and line side modem as VDSL modems, ADSL or other types of modems can be used to realize the invention.

The combined analog telephony and data xDSL subscriber side modem 761 can also be located in gateway 200, and as illustrated in FIG. 3, a variety of devices can be directly connected to the gateway using twisted wire pair, coaxial cable, or other types of wiring.

In transmitting signals to and from BDT 130 to BNU 140 over optical fiber 160, or to and from BDT 130 to USAM 340, a frame structure based on the Synchronous Digital Hierarchy (SDH) standard is utilized in which the most significant bit (bit 1) is sent first and the least significant bit (bit 8) is sent last. A system specific datalink channel is sent within the SDH frame. The SDH frame itself has 2430 bytes in a 125 $\mu$s frame, divided into overhead areas, a 41 cell payload area and a 3 byte footer which is not used.

Figure 13A:
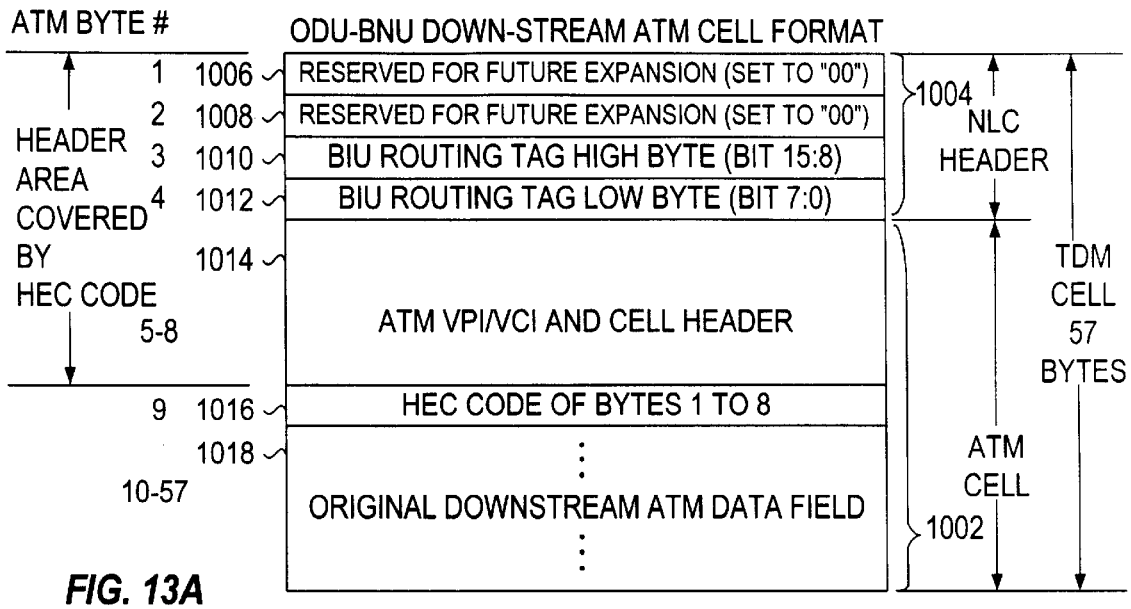
FIG. 13A illustrates the downstream ATM cell format for cells from the BDT to the BNU or USAM.

The downstream ATM data (BDT 130 to BNU 140 or BDT 130 to USAM 340) is carried in a cell format illustrated in FIG. 13A, in which 4 system specific bytes form a downstream header 1004 which is added to a 53 byte ATM cell 1002. The first two bytes in the header, 1006 and 1008, are left unused, while the following two bytes 1010 and 1012 contain two BIU 150 routing tags, BIU 150 routing tag high byte 1010, and BIU routing tag low byte 1012. An ATM Virtual Path Indicator/Virtual Channel Indicator (VPI/VCI) and cell header field 1014 are also present. A Header Error Control (HEC) field 1016 contains an error correction code word which covers the header 1004 and the VPI/VCI cell header field 1014.

Figure 13B:
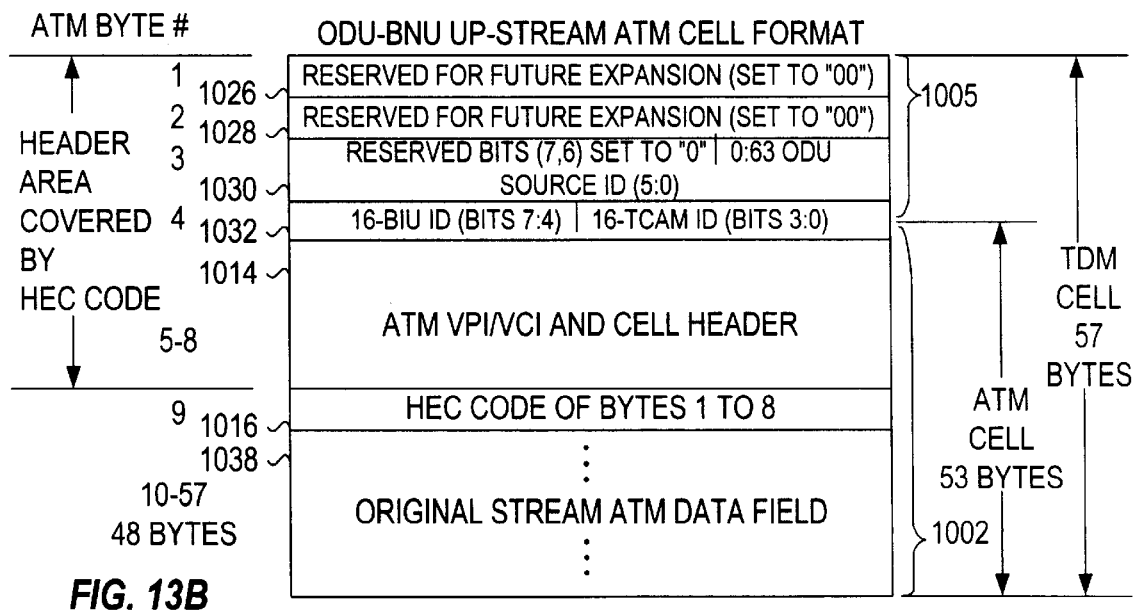
FIG. 13B illustrates the downstream ATM cell format for cells from the BDT to the BNU or USAM.

Upstream ATM data is carried in a cell format illustrated in FIG. 13B, in which 4 system specific bytes form an upstream header 1005, which contains two unused bytes 1026 and 1028, an ODU source ID byte 1030, and a TCAM ID byte 1032. An ATM VPI/VCI cell header field 1014 is also present, as is an HEC field 1016. An ATM cell 1002 of 53 bytes contains the ATM data.

Figure 14A:
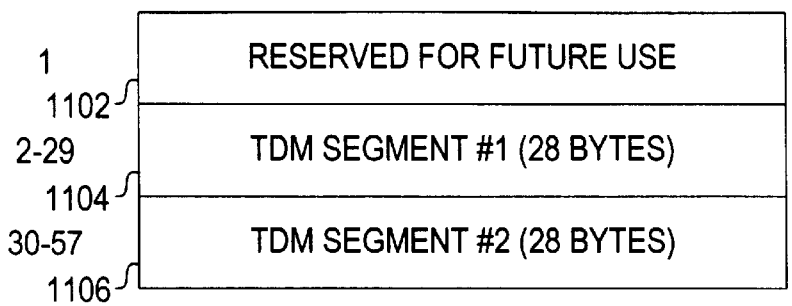
FIG. 14A illustrates the Time Division Multiplexing (TDM) cell format for transmissions from the BDT to the BNU or USAM.

Time Division Multiplex (TDM) data is carried in both directions on optical fiber 160 (BDT 130 to BNU 140 or BDT 130 to USAM 340) as well as on the twisted wire pair BDT-USAM link 226 in a cell format of 57 bytes. In both directions, the TDM cell consists of two segments of 28 bytes and a TDM cell reserved byte, as illustrated in FIG. 14A, in which a 57 byte TDM cell is comprised of a TDM cell reserved byte 1102, a first TDM segment 1104, and a second TDM segment 1106.

Figure 14B:
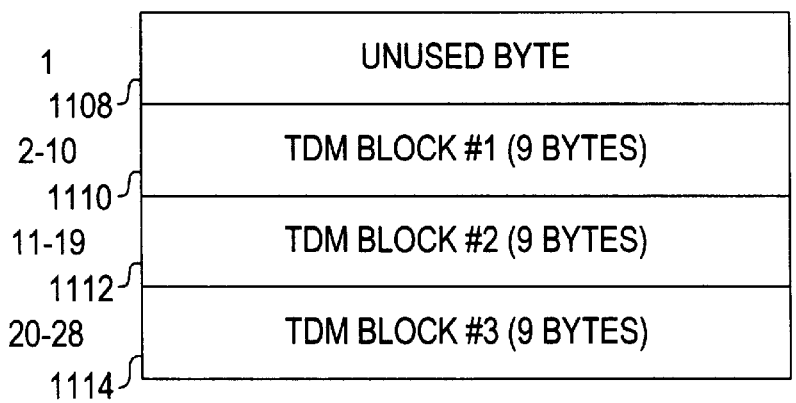
FIG. 14B illustrates the TDM segment individual DSO mapping.

As illustrated in FIG. 14B, the individual DS0s within the TDM segments are mapped into three TDM blocks of nine bytes each. A reserved segment byte 1108 precedes a first TDM block 1110, a second TDM block 1112, and a third TDM block 1114.

Figure 14C:
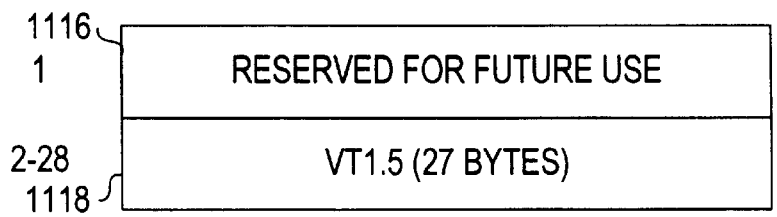
FIG. 14C illustrates the TDM segment VT1.5 mapping.

An asynchronous virtual tributary (VT 1.5) can be transported in a TDM segment as illustrated in FIG. 14C by sending one reserved VT 1.5 byte 1116 followed by a 27 byte VT1.5 field 1118.

The particular mapping of DS0s in a TDM block is illustrated in FIG. 15, where eight DS0 channels are transported in bytes 2–9 (1204, 1206, 1208, 1210, 1212, 1214, 1216, and 1218 respectively). The signaling information for each DS0 is transported in a signaling byte. The signaling byte is the first byte in the nine byte sequence which forms a frame, and each of eight frames carries the signaling information for one DS0 channel. As shown in FIG. 15, channel 1 signaling byte 1214 appears as the first byte of frame 1, channel 2 signaling byte 1216 as byte 1 of frame 2.

Channel 3–8 signaling bytes (1218, 1220, 1222, 1224, 1226, 1228 respectively) appear in the first byte of frames 3–8 respectively.

An advantage of transmitting the voice and data information in an ATM format is that cells are routed to their destination regardless of data type, and no discrimination needs to be made between TDM voice signals and high speed data. The destination can be a BIU 150, USAM linecard plug-in 920, ANID 610, PID 196, set-top 198, computer with NIC card 191, telephony interface unit 710, LAN unit 720, or gateway 200.

The mapping of cells occurs at both the network side, where cells are formed from the data received from ATM network 110, and from PSTN 100, and at the subscriber side, where the different devices generate TDM voice information or high speed data. As an example, a PID 196 would generate TDM information and a set-top 198 or computer with NIC card 191 would generate high speed data. The devices in the residence or the gateway 200 would map the information into ATM cells for transmission on the Unified Access Platform.

In a preferred embodiment the mapping of TDM information into ATM cells, and the formation of the headers, is performed in one or more Application Specific Integrated Circuits (ASICs). Methods for the implementation of such ASICs are well known to those skilled in the art. In an alternate embodiment the mapping of TDM and high speed data information can be performed in software.

Within BDT 130 the mapping of TDM information into cells allows for the efficient routing of those cells to the individual Optical Distribution Units (ODUs) in the BDT which generate and receive optical signals from BNUs 140 or USAMs 340. In a preferred embodiment there are 64 ODUs in BDT 130. Furthermore, a BDT common control card controls the routing of cells to the individual ODUs in BDT 130.

The use of ATM cells in BDT 130 and over optical fiber 160 allows voice and data information to be simultaneously routed from one BDT 130 to BNUs 140, USAM ADSL-RT 520, USAM ADSL-CO 510, and USAM VDSLs 620, where traditional analog telephone signals can be generated along with high speed data signals. Because the transmission technique and media for transmission of high speed data signals will vary from installation to installation, it is important to be able to support the various xDSL and coaxial drop cable networks from one Unified Access Platform.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What I claim is:

1. A method of simultaneously providing telephony and cell-based services, said method comprising the steps of:
   a) receiving digital telephony signals at a broadband digital terminal;
   b) receiving cell-based signals at said broadband digital terminal;
   c) combining said digital telephony signals with said cell-based signals to form a combined digital telephony and cell-based signal;
   d) transmitting said combined digital telephony and cell-based signal to an access multiplexor over a telecommunications link;
   e) receiving said combined digital telephony and cell-based signal at said access multiplexor;
   f) generating an analog telephony signal from said combined digital telephony and cell-based signal on a first linecard located in said access multiplexor;
   g) transmitting said analog telephony signal over a first twisted wire pair to a first subscriber location;
   h) generating a twisted-wire-pair-compatible cell-based signal from said combined digital telephony and cell-based signal on a second linecard located in said access multiplexor; and
   i) transmitting said twisted-wire-pair-compatible cell-based signal over a second twisted wire pair to a second subscriber location.

2. The method described in claim 1 wherein said access multiplexor is located in a central office.

3. The method described in claim 1 wherein said first and second subscriber locations are the same.

4. A method of simultaneously providing telephony and cell-based services, said method comprising the steps of:
   a) receiving digital telephony signals at a broadband digital terminal;
   b) receiving cell-based signals at said broadband digital terminal;
   c) combining said digital telephony signals with said cell-based signals to form a first combined digital telephony and cell-based signal and a second combined digital telephony and cell-based signal;
   d) transmitting said first combined digital telephony and cell-based signal to a first access multiplexor over a telecommunications link;
   e) transmitting said second combined digital telephony and cell-based signal to a second access multiplexor over a fiber optic line;
   f) receiving said first combined digital telephony and cell-based signal at said first access multiplexor;
   g) generating an analog telephony signal from said first combined digital telephony and cell-based signal on a first linecard located in said first access multiplexor;
   h) transmitting said analog telephony signal over a first twisted wire pair from said first access multiplexor to a first subscriber location;
   i) receiving said second combined digital telephony and cell-based signal at said second access multiplexor;
   j) generating a twisted-wire-pair-compatible cell-based signal from said second combined digital telephony and cell-based signal on a second linecard located in said second access multiplexor; and
   k) transmitting said twisted-wire-pair-compatible cell-based signal from said second access multiplexor over a second twisted wire pair to a second subscriber location.

5. The method described in claim 4 wherein said first access multiplexor is located in a central office.

6. A method of providing telephony and cell-based services, said method comprising the steps of:
   a) receiving digital telephony signals at a broadband digital terminal;
   b) receiving cell-based signals at said broadband digital terminal;
   c) combining said digital telephony signals with said cell-based signals to form a combined digital telephony and cell-based signal;
   d) transmitting said combined digital telephony and cell-based signal to an access multiplexor over a telecommunications link;

e) receiving said combined digital telephony and cell-based signal at said access multiplexor;

f) generating an analog telephony signal from said combined digital telephony and cell-based signal on a single linecard in said access multiplexor;

g) generating a twisted-wire-pair-compatible cell-based signal from said combined digital telephony and cell-based signal on said single linecard in said access multiplexor;

h) combining said analog telephony signal with said twisted-wire-pair-compatible cell-based signal on said single linecard to form a combined analog telephony and twisted-wire-pair-compatible cell-based signal;

i) transmitting said combined analog telephony and twisted-wire-pair-compatible cell-based signal from said single linecard to a subscriber location;

j) receiving said combined analog telephony and twisted-wire-pair-compatible cell-based signal at a diplex receiver located substantially near a demarcation point of said subscriber location; and k) separating said analog telephony signal from said twisted-wire-pair-compatible cell-based signal in said diplex receiver.

7. A method of providing telephony and cell-based services, said method comprising the steps of:

a) receiving digital telephony signals at a broadband digital terminal;

b) receiving cell-based signals at said broadband digital terminal;

c) combining said digital telephony signals with said cell-based signals to form a combined digital telephony and cell-based signal;

d) transmitting said combined digital telephony and cell-based signal to an access multiplexor over a telecommunications link;

e) receiving said combined digital telephony and cell-based signal at said access multiplexor;

f) generating a combined twisted-wire-pair-compatible cell-based and digital telephony signal from said combined digital telephony and cell-based signal on a single linecard in said access multiplexor;

g) transmitting said combined twisted-wire-pair-compatible cell-based and digital telephony signal from said single linecard to a subscriber location;

h) receiving said combined twisted-wire-pair-compatible cell-based and digital telephony signal at a receiving device located substantially near a demarcation point of said subscriber location; and i) generating an analog telephony signal from said combined twisted-wire-pair-compatible cell-based and digital telephony signal in said receiving device.

8. The method described in claim 7 wherein said receiving device is powered by said access multiplexor.

9. A system for simultaneously providing telephony and cell-based services, said system comprising:

a) means for receiving digital telephony signals at a broadband digital terminal;

b) means for receiving cell-based signals at said broadband digital terminal;

c) means for combining said digital telephony signals with said cell-based signals to form a combined digital telephony and cell-based signal;

d) means for transmitting said combined digital telephony and cell-based signal to an access multiplexor over a telecommunications link;

e) means for receiving said combined digital telephony and cell-based signal at said access multiplexor;

f) means for generating an analog telephony signal from said combined digital telephony and cell-based signal on a first linecard located in said access multiplexor;

g) means for transmitting said analog telephony signal over a first twisted wire pair to a first subscriber location;

h) means for generating a twisted-wire-pair-compatible cell-based signal from said combined digital telephony and cell-based signal on a second linecard located in said access multiplexor; and i) means for transmitting said twisted-wire-pair-compatible cell-based signal over a second twisted wire pair to a second subscriber location.

10. The system described in claim 9 wherein said access multiplexor is located in a central office.

11. The system described in claim 9 wherein said first and second subscriber locations are the same.

12. A system for simultaneously providing telephony and cell-based services, said system comprising:

a) means for receiving digital telephony signals at a broadband digital terminal;

b) means for receiving cell-based signals at said broadband digital terminal;

c) means for combining said digital telephony signals with said cell-based signals to form a first combined digital telephony and cell-based signal and a second combined digital telephony and cell-based signal;

d) means for transmitting said first combined digital telephony and cell-based signal to a first access multiplexor over a telecommunications link;

e) means for transmitting said second combined digital telephony and cell-based signal to a second access multiplexor over a fiber optic line;

f) means for receiving said first combined digital telephony and cell-based signal at said first access multiplexor;

g) means for generating an analog telephony signal from said first combined digital telephone and cell-based signal on a first linecard located in said first access multiplexor;

h) means for transmitting said analog telephony signal over a first twisted wire pair from said first access multiplexor to a first subscriber location;

i) means for receiving said second combined digital telephony and cell-based signal at said second access multiplexor;

j) means for generating a twisted-wire-pair-compatible cell-based signal from said second combined digital telephone and cell-based signal on a second linecard located in said second access multiplexor; and k) means for transmitting said twisted-wire-pair-compatible cell-based signal from said second access multiplexor over a second twisted wire pair to a second subscriber location.

13. The system described in claim 12 wherein said first access multiplexor is located in a central office.

14. A system for providing telephony and cell-based services, said system comprising:

a) means for receiving digital telephony signals at a broadband digital terminal;

b) means for receiving cell-based signals at said broadband digital terminal;

c) means for combining said digital telephony signals with said cell-based signals to form a combined digital telephony and cell-based signal;
d) means for transmitting said combined digital telephony and cell-based signal to an access multiplexor over a telecommunications link;
e) means for receiving said combined digital telephony and cell-based signal at said access multiplexor;
f) means for generating an analog telephony signal from said combined digital telephony and cell-based signal on a single linecard in said access multiplexor;
g) means for generating a twisted-wire-pair-compatible cell-based signal from said combined digital telephony and cell-based signal on said single linecard in said access multiplexor;
h) means for combining said analog telephony signal with said twisted-wire-pair-compatible cell-based signal on said single linecard to form a combined analog telephony and twisted-wire-pair-compatible cell-based signal;
i) means for transmitting said combined analog telephony and twisted-wire-pair-compatible cell-based signal from said single linecard to a subscriber location;
j) means for receiving said combined analog telephony and twisted-wire-pair-compatible cell-based signal at a diplex receiver located substantially near a demarcation point of said subscriber location; and
k) means for separating said analog telephony signal from said twisted-wire-pair-compatible cell-based signal in said diplex receiver.

15. A system for providing telephony and cell-based services, said system comprising:
a) means for receiving digital telephony signals at a broadband digital terminal;
b) means for receiving cell-based signals at said broadband digital terminal;
c) means for combining said digital telephony signals with said cell-based signals to form a combined digital telephony and cell-based signal;
d) means for transmitting said combined digital telephony and cell-based signal to an access multiplexor over a telecommunications link;
e) means for receiving said combined digital telephony and cell-based signal at said access multiplexor;
f) means for generating a combined twisted-wire-pair-compatible cell-based and digital telephony signal from said combined digital telephony and cell-based signal on a single linecard in said access multiplexor;
g) means for transmitting said combined twisted-wire-pair-compatible cell-based and digital telephony signal from said single linecard to a subscriber location;
h) means for receiving said combined twisted-wire-pair-compatible cell-based and digital telephony signal at a receiving device located substantially near a demarcation point of said subscriber location; and
i) means for generating an analog telephony signal from said combined twisted-wire-pair-compatible cell-based and digital telephony signal in said receiving device.

16. The system described in claim 15 wherein said receiving device is powered by said access multiplexor.

17. In a telecommunications access system, a method for simultaneously delivering voice and cell-based services, said method comprising the steps of:
a) receiving a plurality of first cell-based signals at a broadband digital terminal;
b) receiving a plurality of voice signals at the broadband digital terminal;
c) forming second cell-based signals from the voice signals;
d) combining the first cell-based signals and the second cell-based signals to form a plurality of combined cell-based signals;
e) simultaneously transmitting to each of a plurality of access terminals, using an individual fiber optic connection, the combined cell-based signals addressed to each access terminal;
f) generating, on a single linecard in one of the access terminals, a subscriber voice signal corresponding to one of the voice signals;
g) generating, on the single linecard, a subscriber data signal corresponding to one of the first cell-based signals;
h) multiplexing, on the single linecard, the subscriber voice signal and the subscriber data signal to form a multiplexed subscriber signal; and
i) transmitting the multiplexed subscriber signal to a first subscriber location served by the access terminal.

18. In a telecommunications access system, a method for simultaneously delivering voice and cell-based services, said method comprising the steps of:
a) receiving a plurality of first cell-based signals at a broadband digital terminal;
b) receiving a plurality of voice signals at the broadband digital terminal;
c) forming second cell-based signals from the voice signals;
d) combining the first cell-based signals and the second cell-based signals to form a plurality of combined cell-based signals;
e) simultaneously transmitting to each of a plurality of access terminals, using an individual fiber optic connection, the combined cell-based signals addressed to each access terminal;
f) generating, on a first linecard in one of the access terminals, a subscriber voice signal corresponding to one of the voice signals;
g) generating, on a second linecard in the one access terminal, a subscriber data signal corresponding to one of the first cell-based signals;
h) transmitting the generated subscriber voice signal from the first linecard to a first subscriber location; and
i) transmitting the generated subscriber data signal from the second linecard to a second subscriber location.

19. In a telecommunications access system, a method for simultaneously delivering voice and cell-based services, said method comprising the steps of:
a) receiving a plurality of digital-time-division-multiplexed voice signals at a broadband digital terminal;
b) receiving a plurality of first cell-based signals at the broadband digital terminal;
c) mapping the digital-time-division-multiplexed voice signals into second cell-based signals;
d) combining the first cell-based signals and the second cell-based signals to form combined cell-based signals, wherein selected cells of the combined cell-based signals contain the second cell-based signals;
e) simultaneously transmitting to each of a plurality of access terminals, using an individual fiber optic connection, the combined cell-based signals addressed to each access terminal;

f) generating, on a first linecard in one of the access terminals, a subscriber voice signal corresponding to one of the digital-time-division-multiplexed voice signals;

g) generating, on a second linecard in the one access terminal, a subscriber data signal corresponding to one of the first cell-based signals;

h) transmitting the subscriber voice signal to a first subscriber location; and i) transmitting the subscriber data signal to a second subscriber location.

20. In a telecommunications access system, a method for simultaneously delivering voice and cell-based services, said method comprising the steps of:

a) receiving a plurality of digital-time-division-multiplexed voice signals at a broadband digital terminal;

b) receiving a plurality of first cell-based signals at the broadband digital terminal;

c) mapping the digital-time-division-multiplexed voice signals into second cell-based signals;

d) combining the first cell-based signals and the second cell-based signals to form combined cell-based signals, wherein selected cells of the combined cell-based signals contain the second cell-based signals;

e) simultaneously transmitting to each of a plurality of access terminals, using an individual fiber optic connection, the combined cell-based signals addressed to each access terminal;

f) generating, on a single linecard in one of the access terminals, a subscriber voice signal corresponding to one of the digital-time-division-multiplexed voice signals;

g) generating, on the single linecard, a subscriber data signal corresponding to one of the first cell-based signals;

h) multiplexing, on the single linecard, the subscriber voice signal and the subscriber data signal to form a multiplexed subscriber signal; and i) transmitting the multiplexed subscriber signal to at least one subscriber location.

21. The method of claims 17, 18, 19 or 20 wherein at least one of the plurality of access terminals is located in a central office.

22. The method of claims 17, 18, 19 or 20 wherein at least one of the plurality of access terminals is located within an ADSL span distance from a subscriber location.

23. The method of claims 17, 18, 19 or 20 wherein at least one of the plurality of access terminals is located within a VDSL span distance from a subscriber location.

24. The method of claims 19 or 20 wherein the digital-time-division-multiplexed voice signals include a plurality of DSOs, and each individual DSO is mapped into selected cells of the combined cell-based signals.

25. The method of claims 17, 18, 19 or 20 wherein one of the plurality of first cell-based signals comprises an Asynchronous Transfer Mode (ATM) signal.

26. The method of claims 17, 18, 19 or 20 wherein one of the plurality of second cell-based signals comprises an ATM signal.

27. The method of claims 17, 18, 19 or 20 wherein one of the plurality of combined cell-based signals comprises an ATM signal.

28. A system for simultaneously delivering voice and cell-based services, comprising a broadband digital terminal, wherein the broadband digital terminal receives a plurality of voice signals and a plurality of first cell-based signals, maps at least one of the voice signals into second cell-based signals, combines the first cell-based signals and the second cell-based signals to form combined cell-based signals, and simultaneously transmits to each of a plurality of access terminals, using an individual fiber-optic connection, the combined cell-based signals addressed to each access terminal; and wherein at least one access terminal:

a) generates, on a single linecard in the at least one access terminal, a subscriber data signal corresponding to one of the first cell-based signals;

b) generates, on the single linecard, a subscriber voice signal corresponding to one of the voice signals; and c) multiplexes, on the single linecard, the subscriber voice signal and the subscriber data signal to form a multiplexed subscriber signal.

29. A system for simultaneously delivering voice and cell-based services, comprising a broadband digital terminal, wherein the broadband digital terminal receives a plurality of digital-time-division-multiplexed voice signals and first cell-based signals, maps the digital-time-division-multiplexed voice signals into second cell-based signals, combines the first cell-based signals and the second cell-based signals to form combined cell-based signals, wherein selected cells of the combined cell-based signals are reserved for the second cell-based signals, simultaneously transmits to each of a plurality of access terminals, using an individual fiber-optic connection, the combined cell-based signals addressed to each access terminal, and wherein at least one access terminal:

a) generates, on a single linecard in the at least one access terminal, a subscriber voice signal corresponding to one of the digital-time-division-multiplexed voice signals;

b) generates, on the single linecard, a subscriber data signal corresponding to one of the first cell-based signals; and c) multiplexes, on the single linecard, the subscriber voice signal and the subscriber data signal to form a multiplexed subscriber signal.

30. The system of claims 28 or 29 wherein at least one of the plurality of access terminals is located in a central office.

31. The system of claims 28 or 29 wherein at least one of the plurality of access terminals is located within an ADSL span distance from a subscriber location.

32. The system of claims 28 or 29 wherein at least one of the plurality of access terminals is located within a VDSL span distance from a subscriber location.

33. The system of claims 28 or 29 wherein one of the plurality of first cell-based signals comprises an ATM signal.

34. The system of claims 28 or 29 wherein one of the plurality of second cell-based signals comprises an ATM signal.

35. The system of claims 28 or 29 wherein one of the plurality of combined cell-based signals comprises an ATM signal.

36. The method of claims 1, 6, or 7, wherein said access multiplexor is located in a central office.

37. The method of claims 1, 6, or 7, wherein said access multiplexor is located within an ADSL span distance from a subscriber location.

38. The method of claims 1, 6, or 7, wherein said access multiplexor is located within a VDSL span distance from a subscriber location.

39. The method of claim 4, wherein at least one access multiplexor is located in a central office.

40. The method of claim 4, wherein at least one access multiplexor is located within an ADSL span distance from a subscriber location.

41. The method of claim 4, wherein at least one access multiplexor is located within a VDSL span distance from a subscriber location.

42. The system of claims 9, 14, or 15, wherein said access multiplexor is located in a central office.

43. The system of claims 9, 14, or 15, wherein said access multiplexor is located within an ADSL span distance from a subscriber location.

44. The system of claims 9, 14, or 15, wherein said access multiplexor is located within a VDSL span distance from a subscriber location.

45. The system of claim 12, wherein at least one access multiplexor is located in a central office.

46. The system of claim 12, wherein at least one access multiplexor is located within an ADSL span distance from a subscriber location.

47. The system of claim 12, wherein at least one access multiplexor is located within a VDSL span distance from a subscriber location.

* * * * *